(12) United States Patent
Fuchie

(10) Patent No.: US 8,134,557 B2
(45) Date of Patent: Mar. 13, 2012

(54) IMAGE PROCESSING APPARATUS AND IMAGE PROCESSING METHOD

(75) Inventor: Takaaki Fuchie, Kanagawa (JP)

(73) Assignee: Sony Corporation, Tokyo (JP)

( * ) Notice: Subject to any disclaimer, the term of this patent is extended or adjusted under 35 U.S.C. 154(b) by 1001 days.

(21) Appl. No.: 11/684,769

(22) Filed: Mar. 12, 2007

(65) Prior Publication Data

US 2007/0216677 A1 Sep. 20, 2007

(30) Foreign Application Priority Data

Mar. 17, 2006 (JP) ................................. 2006-074719

(51) Int. Cl.
*G06T 11/20* (2006.01)

(52) U.S. Cl. ........ 345/441; 345/420; 345/536; 345/537; 345/557

(58) Field of Classification Search .......... 345/441–443, 345/467–475, 536, 537, 557
See application file for complete search history.

(56) References Cited

U.S. PATENT DOCUMENTS

| | | | |
|---|---|---|---|
| 5,563,995 A | 10/1996 | Shirouzu | |
| 5,748,198 A | 5/1998 | Takeda et al. | |
| 6,057,852 A * | 5/2000 | Krech, Jr. | 345/589 |
| 6,611,267 B2 * | 8/2003 | Migdal et al. | 345/428 |
| 6,629,891 B2 * | 10/2003 | Nagayama | 463/32 |
| 6,744,430 B1 * | 6/2004 | Shimizu | 345/420 |
| 6,744,440 B1 * | 6/2004 | Nakamura | 345/582 |
| 6,952,204 B2 * | 10/2005 | Baumberg et al. | 345/420 |
| 2002/0065133 A1 * | 5/2002 | Nagayama | 463/32 |
| 2002/0190983 A1 * | 12/2002 | Naoi | 345/423 |
| 2004/0189634 A1 * | 9/2004 | Kidera | 345/421 |
| 2005/0156927 A1 * | 7/2005 | Lee et al. | 345/422 |
| 2006/0192779 A1 * | 8/2006 | Kidera | 345/421 |
| 2007/0083383 A1 * | 4/2007 | Van Bael et al. | 705/1 |

FOREIGN PATENT DOCUMENTS

| | | |
|---|---|---|
| JP | 7-234946 | 9/1995 |
| JP | 8-006485 | 1/1996 |
| JP | 2001-195603 | 7/2001 |
| JP | 2002-83316 | 3/2002 |
| JP | 2003-58902 | 2/2003 |

* cited by examiner

*Primary Examiner* — Andrew Wang
*Assistant Examiner* — Abderrahim Merouan
(74) *Attorney, Agent, or Firm* — Oblon, Spivak, McClelland, Maier & Neustadt, L.L.P.

(57) ABSTRACT

The present invention provides an image processing apparatus including: a production section configured to determine polygon groups each composed of a predetermined number of polygons juxtaposed in a first direction successively as an object block, which is an object of a production process, in an order in which the polygon groups are juxtaposed in a second direction substantially perpendicular to the first direction and produce apex data of the polygons which compose the object block in a unit of a polygon; and a determination section configured to store image data corresponding to those polygons which are positioned in a boundary portion of an immediately preceding block, which is a preceding object block to the object block, with respect to the object block from among those polygons which compose the immediately preceding block into a storage section for storing the pixel data in a unit of a data block to determine the number of the polygons which compose the polygon groups and are juxtaposed in the first direction.

9 Claims, 14 Drawing Sheets

RADIAL DIRECTION

CIRCUMFERENTIAL DIRECTION 2A  2B  2C  2

2A

2

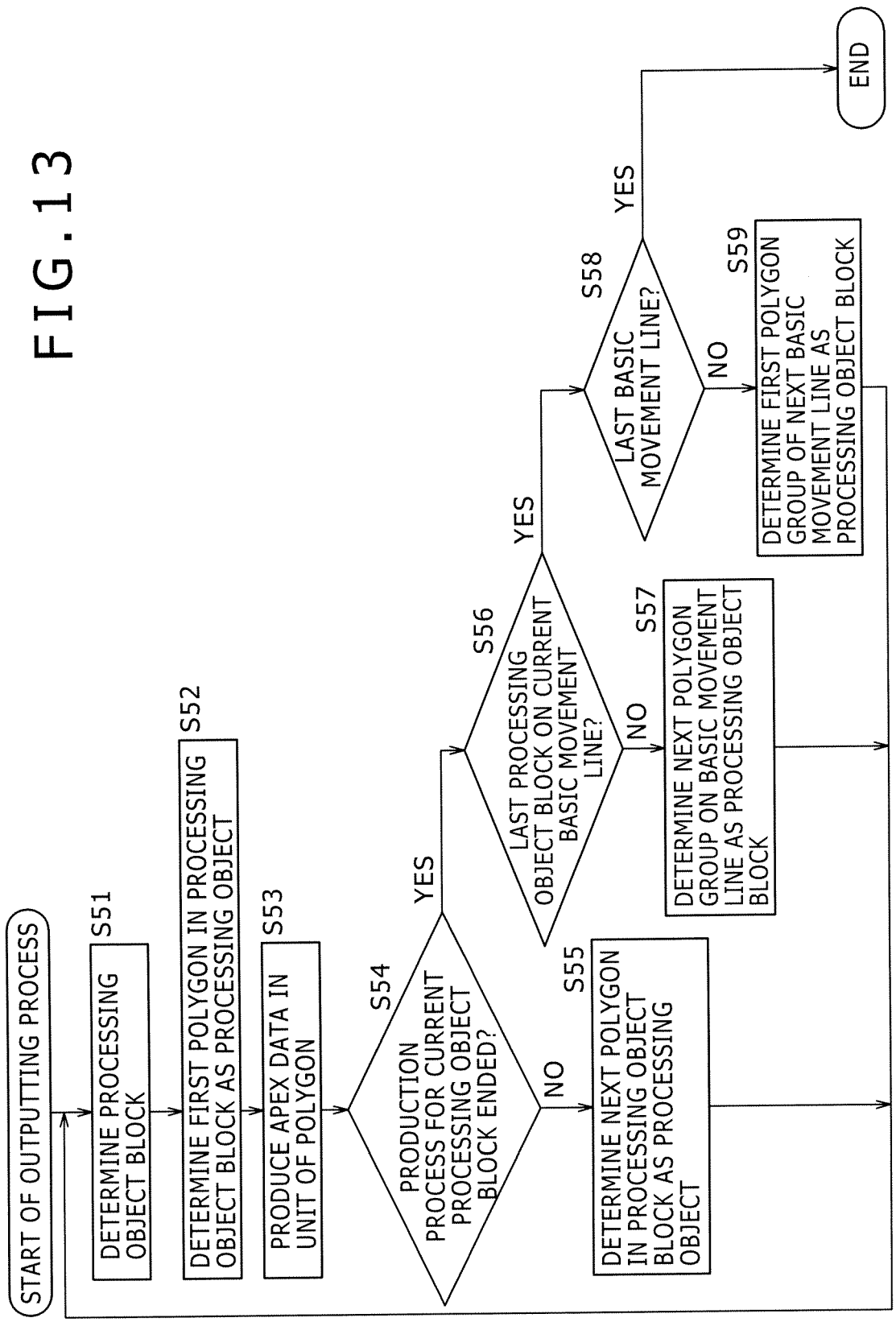

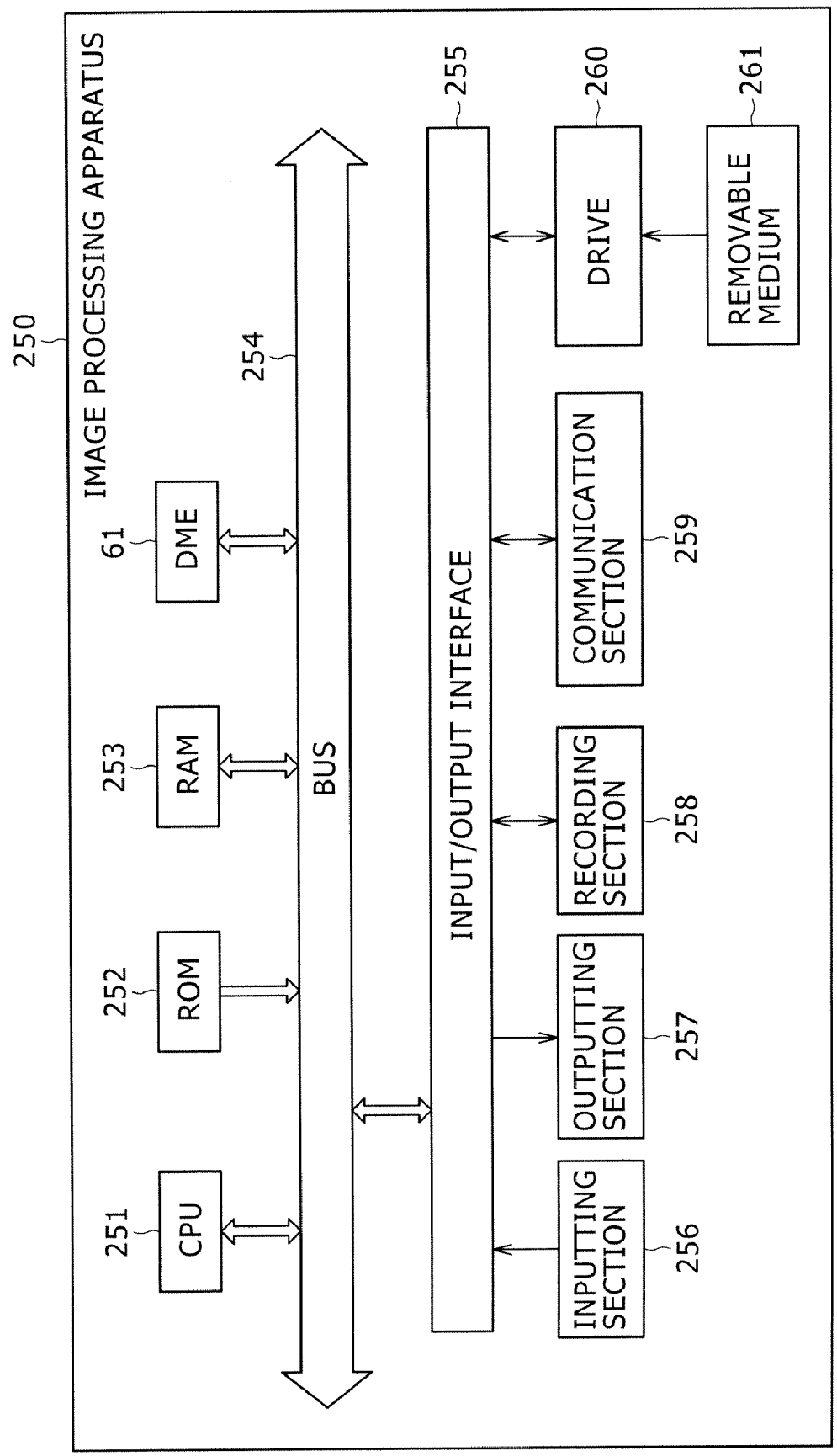

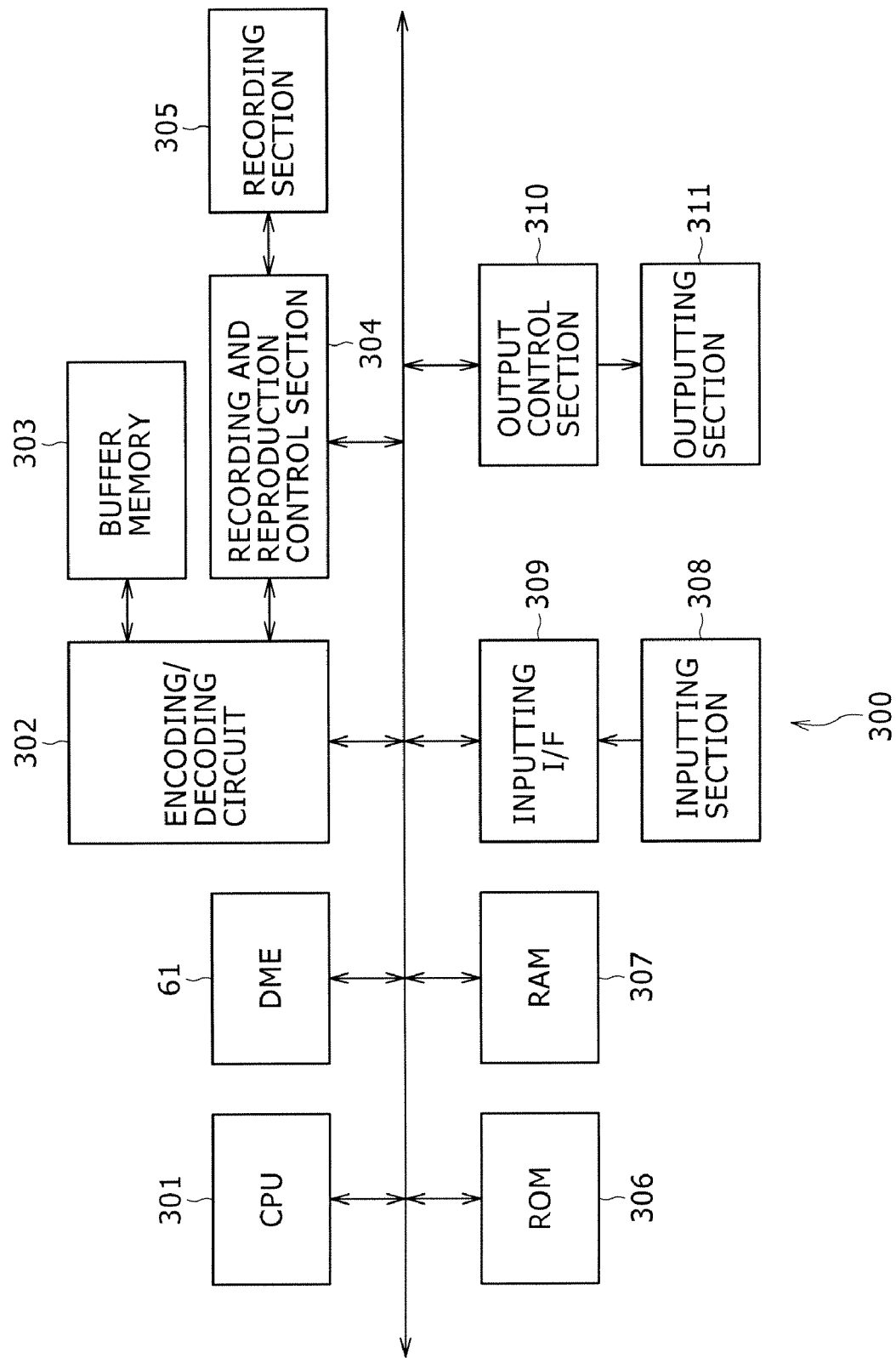

IMAGE PROCESSING APPARATUS AND IMAGE PROCESSING METHOD

CROSS REFERENCES TO RELATED APPLICATIONS

The present invention contains subject matter related to Japanese Patent Application JP 2006-074719, filed in the Japanese Patent Office on Mar. 17, 2006, the entire contents of which being incorporated herein by reference.

BACKGROUND OF THE INVENTION

1. Field of the Invention

This invention relates to an image processing apparatus and an image processing method.

2. Description of the Related Art

In the related art, an image transform apparatus which performs transform of an image in a virtual 3-dimensional space produces a model of a body shape composed of a combination of polygons such as triangles and performs texture mapping of affixing an image to the model to perform transform of the image. The image transform apparatus is disclosed, for example, in Japanese Patent Laid-Open No. 2002-83316.

Such an image transform apparatus as described above produces, for texture mapping, a texture address, which represents the position of each pixel of an image after transform to be outputted finally on an image to be affixed in texture mapping, in a unit of a polygon corresponding to the pixel. Then, the texture address is stored for each pixel into a memory. At this time, the image transform apparatus stores the texture address into an address of the memory corresponding to the position of a pixel corresponding to the texture address on a screen.

Examples of a mesh which is a set of polygons are described with reference to FIGS. 1A, 1B, 2A and 2B.

FIG. 1 shows a mesh 1 in the form of a square lattice. In particular, the mesh 1 is formed from squares 1C each formed from a polygon 1A and another polygon 1B and disposed in a lattice in a horizontal direction and a vertical direction perpendicular to the horizontal direction. The mesh 1 is used for modeling where transform in a fixed direction such as page turn or wave is involved. For example, if page turn is performed for the mesh 1 shown in FIG. 1A, then the mesh 1 exhibits such a form as seen in FIG. 1B.

FIG. 2A shows a concentric mesh 2. In particular, the mesh 2 is formed from quadrangles 2C each formed from a polygon 2A and another polygon 2B and disposed in radial directions and circumferential directions substantially perpendicular to the radial directions. The mesh 2 is used for modeling where concentric transform such as ripple is involved. For example, if ripple is performed for the mesh 2 shown in FIG. 2A, then the mesh 2 exhibits such a form as seen in FIG. 2B.

An image transform apparatus first produces a model after transform using such a mesh 1 or a mesh 2 as described above and then performs, based on data relating to apexes of polygons which form the model (such data are hereinafter referred to as apex data), apex operation such as modeling transform such as parallel movement, enlargement or reduction or rotation, clipping, perspective projection transform for projection on a screen and so forth in a unit of a polygon. Then, the image transform apparatus performs rasterization, a depth test, texture mapping or the like for converting apex data in a unit of a polygon obtained as a result of the apex operation into data relating to pixels (such data are hereinafter referred to as pixel data), and outputs a resulting image as an image after transform.

It is to be noted that each apex data includes, for example, data of a unit of an apex such as, for example, coordinate values of an apex on a modeling coordinate system, a texture address and a writing coefficient. Meanwhile, each pixel data includes z data representative of a z coordinate of a point at which a straight line interconnecting a virtual eye point and the pixel on the screen crosses the plane, the texture address, the writing coefficient and data representative of the position of the pixel on an output image (the data is hereinafter referred to as position data).

In order for the image transform apparatus to perform transform with a high degree of accuracy, it is necessary to use small size polygons. However, this gives rise to a problem that, for example, when a cache is used to store z data included in pixel data upon a depth test into a memory, the hit rate of the cache is deteriorated, resulting in increase in accessing to the memory.

This problem is described with reference to FIGS. 3 to 5.

It is to be noted that the following description given with reference to FIGS. 3 to 5 proceeds with an assumption that transform of an image is not performed. Also it is assumed that, in FIGS. 3 to 5, a cache used is configured such that z data of 4×4 pixels including four pixels juxtaposed in the horizontal direction and the vertical direction form a cache block which is a storage unit of the cache.

FIG. 3 shows a model 10 which uses a mesh in the form of a square lattice formed from polygons $11_1$, $11_2$, $11_3$, $11_4$, $11_5$, ..., $11_{n1}$, $11_{n1+1}$, ..., $11_{2n1}$, $11_{2n1+1}$, ..., $11_{3n1}$, .... It is to be noted that, where there is no necessity to distinguish the polygons from one another, the polygons are collectively referred to as polygons 11.

It is to be noted that, in FIG. 3, each of round marks including white or void round marks and black or solid round marks represents a pixel, and the white and the black of the colors of the round marks represent a boundary between cache blocks. In particular, z data of pixels represented by white round marks and pixels represented by black round marks belong to cache blocks different from each other. Further, also z data of pixels of white round marks which do not neighbor with each other or z data of pixels of black round marks which do not neighbor with each other belong to cache blocks different from each other.

For example, referring to FIG. 3, z data of 16 pixels $15_1$ to $15_4$, $15_{m1+1}$ to $15_{m1+4}$, $15_{2m1+1}$ to $15_{2m1+4}$ and $15_{3m1+1}$ to $15_{3m1+4}$ represented by black round marks surrounded by a square 12, 16 pixels $15_5$ to $15_8$, $15_{m1+5}$ to $15_{m1+8}$, $15_{2m1+5}$ to $15_{2m1+8}$ and $15_{3m1+5}$ to $15_{3m1+8}$ represented by white round marks surrounded by a square 13, and z data of 16 pixels $15_9$ to $15_{12}$, $15_{m1+9}$ to $15_{m1+12}$, $15_{2m1+9}$ to $15_{2m1+12}$ and $15_{3m1+9}$ to $15_{3m1+12}$ represented by black round marks surrounded by a square 14 belong to different cache blocks from one another. It is to be noted that, where there is no necessity to distinguish the pixels from one another, the pixels are hereinafter referred to collectively as pixels 15.

The image transform apparatus produces, for the polygons 11 which compose the model 10 of FIG. 3, apex data in an order in the horizontal direction in which the polygon 11 are disposed, that is, in an order in the direction indicated by an arrow mark A in FIG. 3.

In particular, the image transform apparatus first produces, for the n1 polygons $11_1$ to $11_{n1}$ juxtaposed along the uppermost row in the vertical direction, apex data in a unit of a polygon 11 in the order of the polygons $11_1$, $11_2$, $11_3$, $11_4$, $11_5$, ..., $11_{n1}$, which is the order in which the polygons are juxtaposed in the horizontal direction. Then, the image transform apparatus produces, for the n1 polygons $11_{n1+1}$ to $11_{2n1}$ juxtaposed along the second uppermost row in the vertical direction, apex data in a unit of a polygon 11 in the order of the polygons $11_{n1+1}, \ldots, 11_{2n1}$, which is the order in which the polygons are juxtaposed in the horizontal direction. Thereafter, the image transform apparatus produces, for the n1 polygons $11_{2n1+1}$, to $11_{3n1}$ juxtaposed along the third uppermost row in the vertical direction, apex data in a unit of a polygon 11 in the order of the polygons $11_{2n1+1}, \ldots, 11_{3n1}$, which is the order in which the polygons are juxtaposed in the horizontal direction. Thereafter, apex data of the polygons 11 in the fourth uppermost and succeeding rows are successively produced similarly.

Further, the image transform apparatus performs apex operation for the apex data produced in such a manner as described above and performs rasterization for the apex data in the order in which the apex data are obtained to obtain pixel data.

In other words, the image transform apparatus obtains results of apex operation of apex data of the polygons 11 in the order of the polygons $11_1, 11_2, 11_3, 11_4, 11_5, \ldots, 11_{n1}$, $11_{n1+1}, \ldots, 11_{2n1}, 11_{2n1+1}, \ldots, 11_{3n1}, \ldots$ and performs rasterization in the order. As a result, pixel data of the pixels 15 are obtained in the order of the pixels $15_1, 15_2, 15_3, 15_4$, $15_5, \ldots, 15_{m1}, 15_{m1+1}, \ldots, 15_{2m1}, 15_{2m1+1}, \ldots, 15_{3m1}, \ldots$ corresponding to the polygons $11_1, 11_2, 11_3, 11_4, 11_5, \ldots,$ $11_{n1}, 11_{n1+1}, \ldots, 11_{2n1}, 11_{2n1+1}, \ldots, 11_{3n1}, \ldots$, respectively.

Further, the image transform apparatus performs a depth test for the image data obtained as a result of the rasterization in the order in which the image data are obtained using the z data stored in the memory.

In particular, the image transform apparatus first reads out the z data of the pixels $15_1$ to $15_4$, $15_{m1+1}$ to $15_{m1+4}$, $15_{2m1+1}$ to $15_{2m1+4}$ and $15_{3m1+1}$ to $15_{3m1+4}$ surrounded by the square 12 as a cache block from the memory. Then, the image transform apparatus successively compares the z data of the pixels $15_1$ to $15_4$ and the z data included in the pixel data of the pixels $15_1$ to $15_4$ obtained as a result of the rasterization with each other in order, respectively, thereby to perform a depth test.

Then, the image transform apparatus first reads out the z data of the pixels $15_5$ to $15_8$, $15_{m1+5}$ to $15_{m1+8}$, $15_{2m1+5}$ to $15_{2m1+8}$ and $15_{3m1+5}$ to $15_{3m1+8}$ surrounded by the square 13 as a cache block from the memory. Then, the image transform apparatus successively compares the z data of the pixels $15_5$ to $15_8$ and the z data included in the pixel data of the pixels $15_5$ to $15_8$ obtained as a result of the rasterization with each other in order, respectively thereby to perform a depth test. Thereafter, the z data of the pixels $15_9$ to $15_{m1}$ are compared with each other in a similar manner to perform a depth test.

At this time, since the number of cache blocks which can be stored into the cache is restricted, when a new cache block is to be read out, the image transform apparatus evicts the cache blocks in order beginning with the oldest cache block as occasion demands.

Accordingly, when the image transform apparatus is to perform a depth test for the pixel $15_{m1+1}$ after a depth text for pixel data of the pixels to $15_9$ to $15_{m1}$, the z data of the 16 pixels 15 included in the square 12 which were read out as a cache block from the memory when the depth text for the pixels $15_1$ to $15_4$ was performed are usually evicted from the cache.

Therefore, when the depth test for the pixel $15_{m1+1}$ is to be performed, it is necessary for the image transform apparatus to read out the cache block of the 16 pixels 15 included in the square 12 again. In other words, it is necessary for the image transform apparatus to read out each cache block three times.

FIG. 4 shows a model 20 which uses a concentric mesh composed of polygons 21, and FIG. 5 shows another model 30 which uses a concentric mesh composed of polygons 31.

In FIG. 4, the image transform apparatus produces apex data and performs apex operation and rasterization of the polygons 21, which compose the model 20, in order in radial directions in which the polygons 21 are arranged thereby to obtain pixel data.

In particular, the image transform apparatus produces apex data and performs apex operation and rasterization of the polygons 21, which are juxtaposed in a radial direction B1, in order beginning with that polygon 21 which is positioned in the proximity of the center O of the model 20. Then, the image transform apparatus produces apex data and performs apex operation and rasterization of those polygons 21, which are positioned on the right side of the polygons 21 mentioned above, in order beginning with the polygon 21 positioned at the center O. Thereafter, apex data of the polygons 21 are produced and apex operation and rasterization are performed similarly.

As a result, it is necessary for the image transform apparatus to read out, for example, the z data of those pixels which are included in a square 22 as a cache block from the memory every time a depth test for pixel data corresponding to the polygons 21 juxtaposed in projection directions B1 and B2 and corresponding to the pixels. In other words, it is necessary to read out each cache block twice.

On the other hand, in FIG. 5, the image transform apparatus produces apex data and performs apex operation and rasterization of the polygons 31 which compose the model 30 of FIG. 5 in an order on concentric circles disposed on the polygons 31 thereby to obtain pixel data.

In particular, the image transform apparatus produces apex data and performs apex operation and rasterization of the polygons 31 juxtaposed concentrically in a circumferential direction C1 in an order of concentric circles on which the polygons 31 are disposed. Then, the image transform apparatus produces apex data and performs apex operation and rasterization of the polygons 31 which neighbor on the outer side of the polygons 31 and are juxtaposed concentrically in a arrow mark C2 in an order in which the polygons 31 are juxtaposed in the direction of the arrow mark C2. Thereafter, apex data of the polygons 31 are produced and apex operation and rasterization are performed similarly.

As a result, it is necessary for the image transform apparatus to read out, for example, the z data of the pixels included in a square 32 from the memory every time a depth test for the image data corresponding to the polygons 31 juxtaposed in the circumferential directions C1 to C4 corresponding to the pixels. In other words, it is necessary for the image transform apparatus to read out each cache block four times.

SUMMARY OF THE INVENTION

Where a plurality of polygons which are small and correspond to z data of a cache block are juxtaposed in a direction different from the direction which corresponds to the direction of the order of production of apex data as described above, usually it is necessary to read out each cache block by a plural number of times because of occurrence of eviction. In other words, the hit efficiency of the cache is low.

As a result, where the size of polygons is reduced in order to achieve transform of a high degree of accuracy, the bandwidth of the memory must be increased, resulting in increase of the power consumption or in increase of the production cost.

Therefore, it is desirable to provide an image processing apparatus and an image processing method which is increased in accessing efficiency to a memory and can transform an image with a high degree of accuracy and with low power consumption.

According to an embodiment of the present invention, there is provided an image processing apparatus including a production section configured to determine polygon groups each composed of a predetermined number of polygons juxtaposed in a first direction successively as an object block, which is an object of a production process, in an order in which the polygon groups are juxtaposed in a second direction substantially perpendicular to the first direction and produce apex data of the polygons which compose the object block in a unit of a polygon, and a determination section configured to store image data corresponding to those polygons which are positioned in a boundary portion of an immediately preceding block, which is a preceding object block to the object block, with respect to the object block from among those polygons which compose the immediately preceding block into a storage section for storing the pixel data in a unit of a data block to determine the number of the polygons which compose the polygon groups and are juxtaposed in the first direction.

The determination section may determine the number of the polygons, which compose the polygon groups and are juxtaposed in the first direction, based on the number of pixel data which compose the data block. In this instance, the determination section may determine the number of the polygons, which compose the polygon groups and are juxtaposed in the first direction, based on the number of data blocks to be stored into the storage section. Further, the determination section determines the number of the polygons, which compose the polygon groups and are juxtaposed in the first direction, based on the length of the polygons.

The image processing apparatus may further include an apex data conversion section configured to perform a conversion process for the apex data produced by the production section such that the polygons defined by apexes corresponding to the apex data may be expanded or reduced, and a pixel data conversion section configured to perform a conversion process for converting the apex data converted by the apex data conversion section into the pixel data.

In this instance, the determination section may determine the number of the polygons, which compose the polygon groups and are juxtaposed in the first direction, based on the number of pixel data which compose the data block. Further, the determination section may determine the number of the polygons, which compose the polygon groups and are juxtaposed in the first direction, based on the number of data blocks to be stored into the storage section. Furthermore, the determination section may determine the number of the polygons, which compose the polygon groups and are juxtaposed in the first direction, based on the length of the polygons.

The image processing apparatus may be configured such that the pixel data include z data of the pixels, and the image processing apparatus further includes a transform processing section configured to compare the z data included in the pixel data converted by the pixel data conversion section with the z data included in the pixel data, which are stored in the storage section, of the pixels corresponding to the pixel data to perform a transform process of transforming an image composed of the pixels.

According to another embodiment of the present invention, there is provided an image processing method including a production step of determining polygon groups each composed of a predetermined number of polygons juxtaposed in a first direction successively as an object block, which is an object of a production process, in an order in which the polygon groups are juxtaposed in a second direction substantially perpendicular to the first direction and producing apex data of the polygons which compose the object block in a unit of a polygon, and a determination step of storing image data corresponding to those polygons which are positioned in a boundary portion of an immediately preceding block, which is a preceding object block to the object block, with respect to the object block from among those polygons which compose the immediately preceding block into a storage section for storing the pixel data in a unit of a data block to determine the number of the polygons which compose the polygon groups and are juxtaposed in the first direction.

In the image processing apparatus and the image processing method, polygon groups each composed of a predetermined number of polygons juxtaposed in a first direction are determined successively as an object block, which is an object of a production process, in an order in which the polygon groups are juxtaposed in a second direction substantially perpendicular to the first direction. Then, apex data of the polygons which compose the object block in a unit of a polygon are produced. Thereafter, image data corresponding to those polygons which are positioned in a boundary portion of an immediately preceding block, which is a preceding object block to the object block, with respect to the object block from among those polygons which compose the immediately preceding block are stored into the storage section to determine the number of the polygons which compose the polygon groups and are juxtaposed in the first direction.

With the image processing apparatus and the image processing method, an image can be transformed.

Further, with the image processing apparatus and the image processing method, the accessing efficiency to the storage section is enhanced, and consequently, transform of an image with a high degree of accuracy can be achieved with low power consumption.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 13 is a flow chart illustrating an outputting process by the image processing system;

FIG. 14 is a block diagram showing an example of a configuration of an image processing apparatus; and FIG. 15 is a block diagram showing an example of a configuration of a recording and reproduction apparatus.

DETAILED DESCRIPTION OF THE RPEFERRED EMBODIMENT

Figure 6:
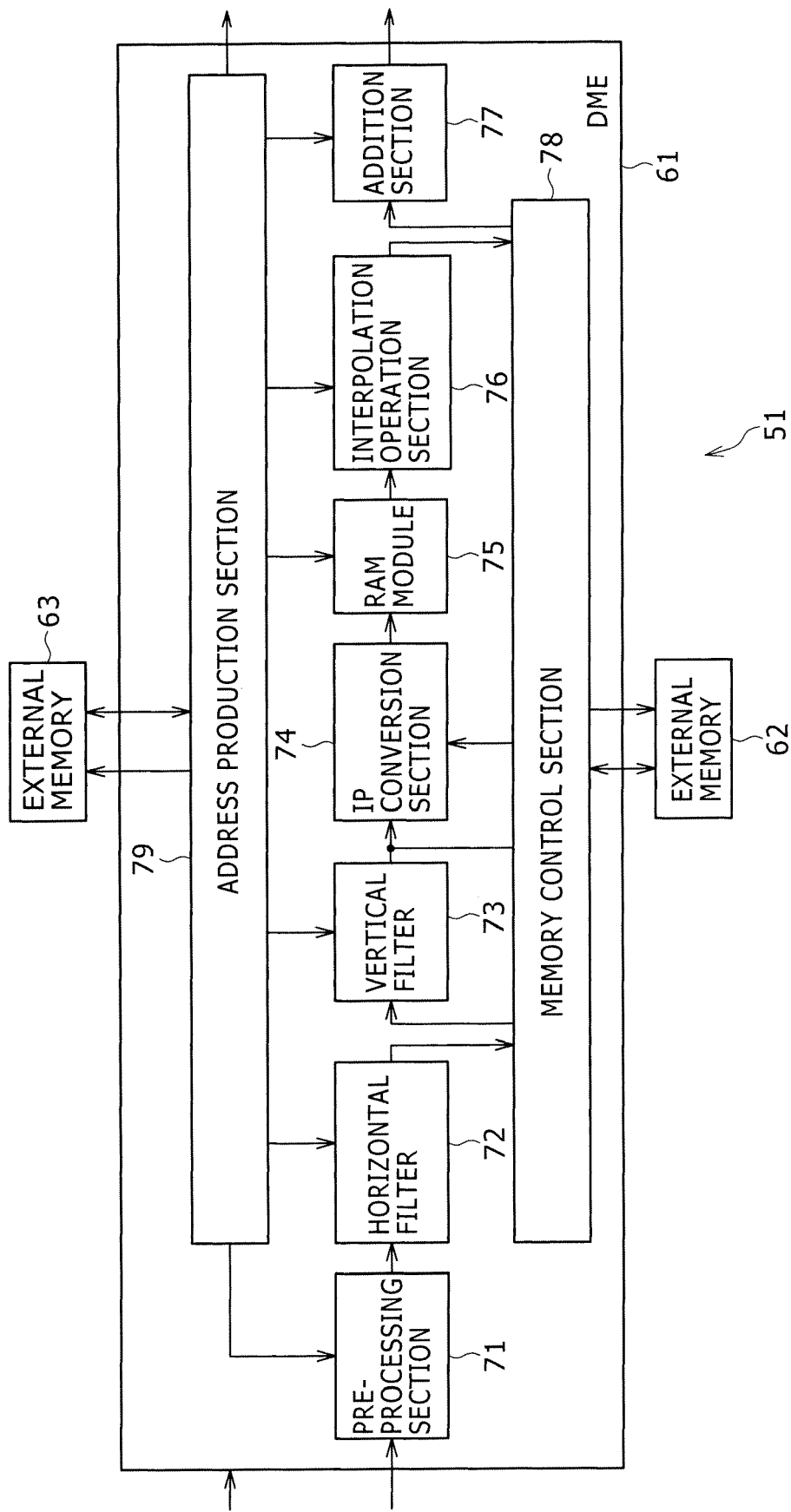
FIG. 6 is a block diagram showing an example of a configuration of an image processing system to which the present invention is applied.

FIG. 6 shows an example of a configuration of an image processing system to which the present invention is applied.

Referring to FIG. 6, the image processing system 51 shown includes a digital image special effect apparatus (Digital Multi Effects apparatus) (hereinafter referred to simply as DME) 61, an external memory 62, and another external memory 63. The image processing system 51 performs reduction, enlargement, change of the type, rotation, leftward and rightward reversal, inversion or movement of an input image which is an image of a unit of a field inputted thereto or applies a special effect to an input image to transform the input image and outputs a resulting image of a unit of a frame. The special effect may be, for example, a mosaic effect, a postalization effect, a negative/positive reversal effect or a defocusing effect in the horizontal direction or the vertical direction.

It is to be noted that the input image is formed from pixel values which represent a luminance signal, a color difference signal and a key signal, which is used for keying, of pixels. Further, the components of the image processing system 51 execute various processes in accordance with a program stored in the external memory 63.

The DME 61 is formed from, for example, an IC (Integrated Circuit), an LSI or the like. The DME 61 includes a pre-processing section 71, a horizontal filter 72, a vertical filter 73, an IP (Interlace Progressive) conversion section 74, a RAM (Random Access Memory) module 75, an interpolation operation section 76, an addition section 77, a memory control section 78 and a address production section 79.

The DME 61 receives an input image, which is an image to be applied upon texture mapping, and a timing signal supplied thereto. The input image is supplied to the pre-processing section 71. The timing signal is supplied to the components of the DME 61 so that the components may perform respective processes in response to the timing signal.

The pre-processing section 71 applies such special effects as mosaic, postalization and positive/negative reversal effects to the input image in response to an instruction signal supplied thereto from the address production section 79. In particular, the pre-processing section 71 performs a filtering process for predetermined ones of pixels, which form the input image, in a unit of a pixel thereby to apply a mosaic effect to the input image. Further, the pre-processing section 71 changes the number of gradations of pixel values of the pixels which form the input image thereby to apply postalization to the input image. Furthermore, the pre-processing section 71 reverses the gradations of the pixel values of the pixels which form the input image thereby to apply positive/negative reversal to the input image. The pre-processing section 71 supplies an image of a unit of a field obtained as a result of the application of special effects to the horizontal filter 72.

The horizontal filter 72 receives a reduction ratio in the horizontal direction supplied thereto from the address production section 79. Then, in order to remove aliasing components in the horizontal direction which appear when an image is reduced, the horizontal filter 72 performs a filtering process corresponding to the received reduction ratio in the horizontal direction for an image in a unit of a field received from the pre-processing section 71. Further, the horizontal filter 72 applies defocusing in the horizontal direction as a special effect to the image in a unit of a field from the pre-processing section 71 in response to an instruction signal supplied thereto from the address production section 79. The horizontal filter 72 supplies an image of a unit of a field obtained as a result of the application of the filtering process or the defocusing process in the horizontal direction to the external memory 62 through the memory control section 78 so that the image is stored into the external memory 62.

The vertical filter 73 receives a reduction ratio in the vertical direction supplied thereto from the address production section 79. Further, in order to remove aliasing components in the vertical direction, which appear when an image is reduced, the vertical filter 73 performs a filtering process corresponding to the received reduction ratio in the vertical direction for an image in a unit of a field supplied thereto from the memory control section 78 and read out in the vertical direction from the external memory 62. Further, the vertical filter 73 performs defocusing in the vertical direction as a special effect for the image in a unit of a field from the memory control section 78 in response to an instruction signal supplied thereto from the address production section 79. The vertical filter 73 supplies an image of a unit of a field obtained as a result of the application of the filtering process or the defocusing process in the vertical direction to the IP conversion section 74. The vertical filter 73 supplies the image also to the external memory 62 through the memory control section 78 so that the image is stored into the external memory 62.

The IP conversion section 74 IP converts an image (interlaced image) in a unit of a field supplied thereto from the vertical filter 73 by referring to another image of a unit of a field immediately preceding to the image and a further image of a unit of a field preceding to the immediately preceding image. Both preceding images are supplied from the memory control section 78 to the IP conversion section 74. The IP conversion section 74 supplies an image (progressive image) of a unit of a frame obtained as a result of the IP conversion to the RAM module 75.

The RAM module 75 stores an image in a unit of a frame from the IP conversion section 74. Further, the RAM module 75 reads out, based on the integral part of a texture address supplied from the address production section 79, that is, the integral part of the coordinate value in the horizontal direction and the integral part of the coordinate value in the vertical direction of the coordinates of those pixels (hereinafter referred to as interpolation pixels) which make an object of interpolation operation by the interpolation operation section 76 on the input image. The RAM module 75 reads out a plurality of pixel values of different pixels to be used for interpolation of the interpolation pixels from among pixel values of pixels which compose an image in a unit of a frame stored already in the RAM module 75 as a pixel value group. For example, the RAM module 75 reads out 64 pixel values of different pixels around an interpolation pixel as a pixel value group. The RAM module 75 supplies the read out pixel value group to the interpolation operation section 76.

It is to be noted that, as regards the coordinate system on the input image, the coordinate values of the pixels which compose the input image in the horizontal direction and the vertical direction are integral values.

The interpolation operation section 76 performs interpolation operation based on values of the decimal part of the texture address, that is, the decimal part of the coordinate values in the horizontal and vertical directions of the coordinates of interpolation pixels on the input image supplied from the address production section 79 and a pixel value group supplied from the RAM module 75 to interpolate the pixel values of the interpolation pixels to perform texture mapping. The interpolation operation section 76 supplies an image in a unit of a frame after interpolation to the external memory 62 through the memory control section 78 so as to be stored into the external memory 62.

The addition section 77 applies shading using a wiring coefficient for each interpolation pixel supplied thereto from the address production section 79. The addition section 77 outputs an image after the addition as an image after transform.

The memory control section 78 controls writing into and reading out from the external memory 62. In particular, the memory control section 78 supplies a control signal for controlling writing into the external memory 62 to the external memory 62 and supplies an image supplied from the horizontal filter 72, vertical filter 73 or interpolation operation section 76 to the external memory 62 so that the image is written into the external memory 62.

Further, the memory control section 78 supplies a control signal for controlling reading out of an image from the external memory 62 to the external memory 62 to control reading out from the external memory 62. Furthermore, the memory control section 78 supplies an image read out from the external memory 62 as a result of the control to the vertical filter 73, IP conversion section 74 and addition section 77.

The address production section 79 controls the components of the image processing system 51 in response to an instruction from a user to transform an input image. Further, the address production section 79 controls writing into and reading out from the external memory 63.

In particular, the address production section 79 supplies an intermediate result or a final result of processing to the external memory 63 together with a control signal for controlling writing into the external memory 63 so as to be stored into the external memory 63 and supplies so that the intermediate or final result of processing is written into the external memory 63. Further, the address production section 79 supplies a control signal for controlling reading out of an intermediate result or a final result of processing from the external memory 63 to the external memory 63 so as to control reading out from the external memory 63 thereby to read out an intermediate or final result of processing from the external memory 63. Details of the address production section 79 are hereinafter described with reference to FIG. 8.

Now, an image transform process executed by the image processing system 51 of FIG. 6 to transform an input image is described with reference to FIG. 7. The image transform process is started, for example, when an input image is inputted to the image processing system 51.

At step S1, the pre-processing section 71 performs such a process as mosaic, postalization or positive/negative reversal for the input image in response to an instruction signal supplied thereto from the address production section 79. Then, the pre-processing section 71 supplies an image of a unit of a field obtained as a result of the process to the horizontal filter 72, whereafter the processing advances to step S2. It is to be noted that, if an instruction signal is not supplied from the address production section 79, then the processing skips step S1 and advances to step S2.

At step S2, the horizontal filter 72 performs, in response to a reduction ratio in the horizontal direction supplied thereto from the address production section 79, a filtering process corresponding to the reduction ratio in the horizontal direction for the image of a unit of a field from the pre-processing section 71. Further, the horizontal filter 72 performs a defocusing process in the horizontal direction as a special effect for the image in response to an instruction signal supplied from the address production section 79. Then, the horizontal filter 72 supplies the image of a unit of a field obtained as a result of the filtering process and/or the defocusing process in the horizontal direction performed for the image to the memory control section 78.

After the process at step S2, the processing advances to step S3, at which the memory control section 78 supplies the image of a unit of a field supplied thereto from the horizontal filter 72 together with a control signal for controlling writing into the external memory 62 to the external memory 62 so that the image may be stored into the external memory 62. After the process at step S3, the processing advances to step S4, at which the memory control section 78 supplies a control signal for controlling reading out of an image from the external memory 62 to the external memory 62. Consequently, the image of a unit of a field stored at step S3 is read out in the vertical direction from the external memory 62 and supplied to the vertical filter 73.

After the process at step S4, the processing advances to step S5, at which the vertical filter 73 performs, in response to a reduction ratio in the vertical direction supplied from the address production section 79, a filtering process corresponding to the reduction ratio in the vertical direction for the image of a unit of a field supplied from the memory control section 78. Further, the vertical filter 73 performs a defocusing process in the vertical direction as a special effect for the image of a unit of a field in response to an instruction signal supplied from the address production section 79. Then, the vertical filter 73 supplies an image in a unit of a field obtained as a result of filtering process and/or the defocusing process to the IP conversion section 74 and also to the memory control section 78.

After the process at step S5, the processing advances to step S6, at which the memory control section 78 supplies the image in a unit of a field supplied from the memory control section 78 together with a control signal for controlling writing into the external memory 62 to the external memory 62 so that the image is stored into the external memory 62. After the process at step S6, the processing advances to step S7. At step S7, the memory control section 78 supplies a control signal for controlling writing of the image from the external memory 62 to the external memory 62 to read out the image of a unit of a field immediately preceding to the image of a unit of a field and stored by the process at step S6 in the immediately preceding operation cycle and the immediately preceding image of a unit of a field from the external memory 62 and supplies the read out images to the IP conversion section 74.

After the process at step S7, the processing advances to step S8, at which the IP conversion section 74 refers to the two images supplied thereto from the memory control section 78 at step S7 to IP convert the image of a unit of a field supplied from the vertical filter 73 at step S5. Then, the IP conversion section 74 supplies an image of a unit of a frame obtained as a result of the IP conversion to the RAM module 75.

At step S9, the RAM module 75 stores an image in a unit of a frame from the IP conversion section 74, whereafter the processing advances to step S10.

At step S10, the RAM module 75 reads out, based on the integral part of the texture address supplied from the address production section 79, a plurality of pixel values of different pixels to be used for interpolation of interpolation pixels as a pixel value group from the pixel values of the pixels which compose an image in a unit of a frame stored already. The pixel value group is supplied to the interpolation operation section 76.

After the process at step S10, the processing advances to step S11, at which the interpolation operation section 76 performs, based on the decimal part of the texture address supplied from the address production section 79 and the pixel value group supplied from the RAM module 75, interpolation operation to interpolate the pixel values of the interpolation pixels. Then, the interpolation operation section 76 supplies an image after the interpolation to the memory control section 78.

After the process at step S11, the processing advances to step S12, at which the memory control section 78 supplies the image from the interpolation operation section 76 together with a control signal for controlling writing into the external memory 62 to the external memory 62 so that the image is stored into the external memory 62. After the process at step S12, the processing advances to step S13, at which the memory control section 78 supplies a control signal for controlling reading out of an image from the external memory 62 to the external memory 62 to read out the image stored at step S12. Thereafter, the processing advances to step S14.

At step S14, the addition section 77 adds shading to the image using a writing coefficient supplied thereto from the address production section 79. Then, the addition section 77 outputs the image after the addition as an image after the conversion, thereby ending the processing.

Figure 7:
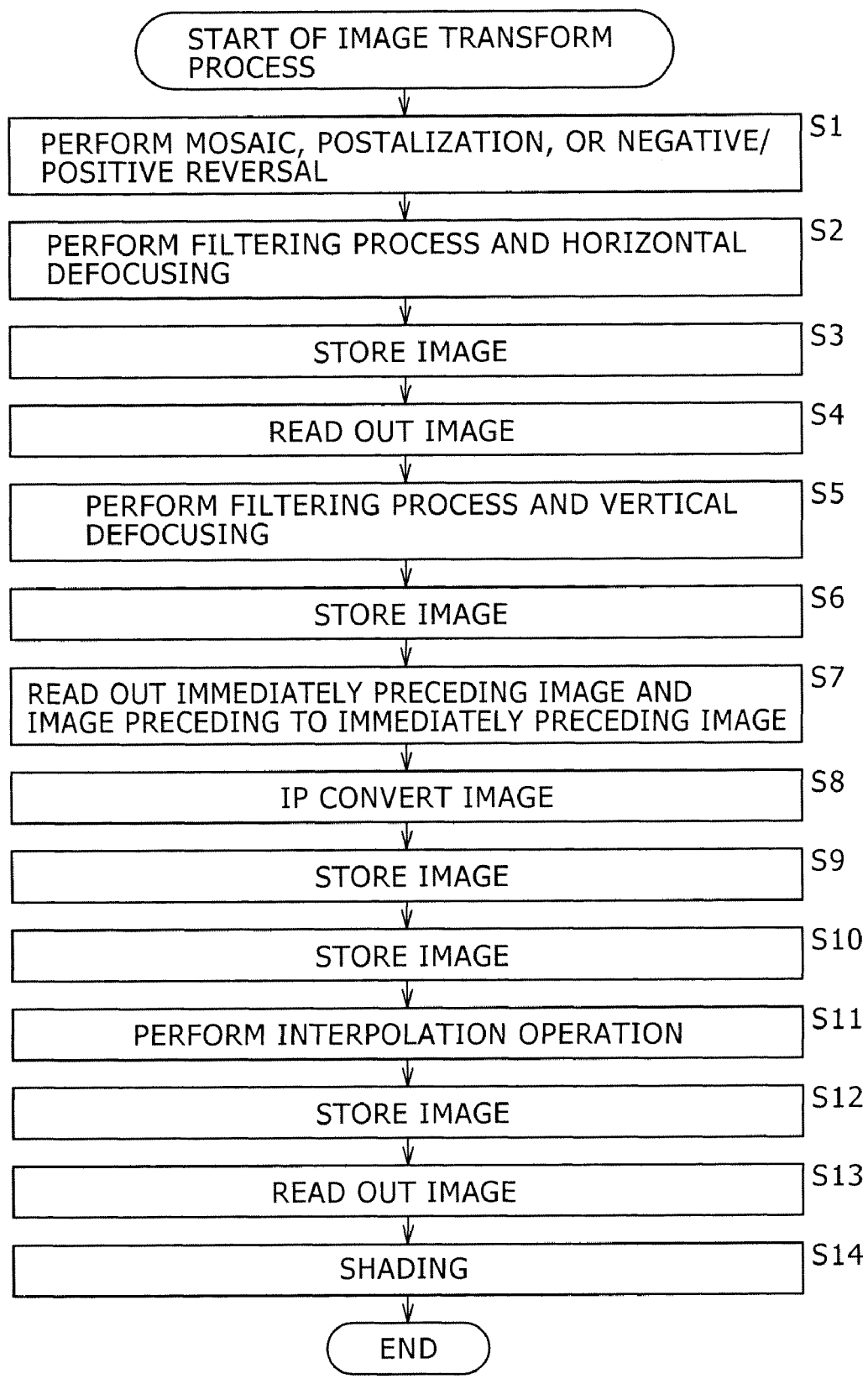
FIG. 7 is a flow chart illustrating an image transform process.

It is to be noted that the processes at steps S1 to S9 of the image transform process of FIG. 7 described above are performed in a unit of a pixel before the interpolation, and the processes at steps S10 to S14 are executed in a unit of an interpolation pixel.

Figure 8:
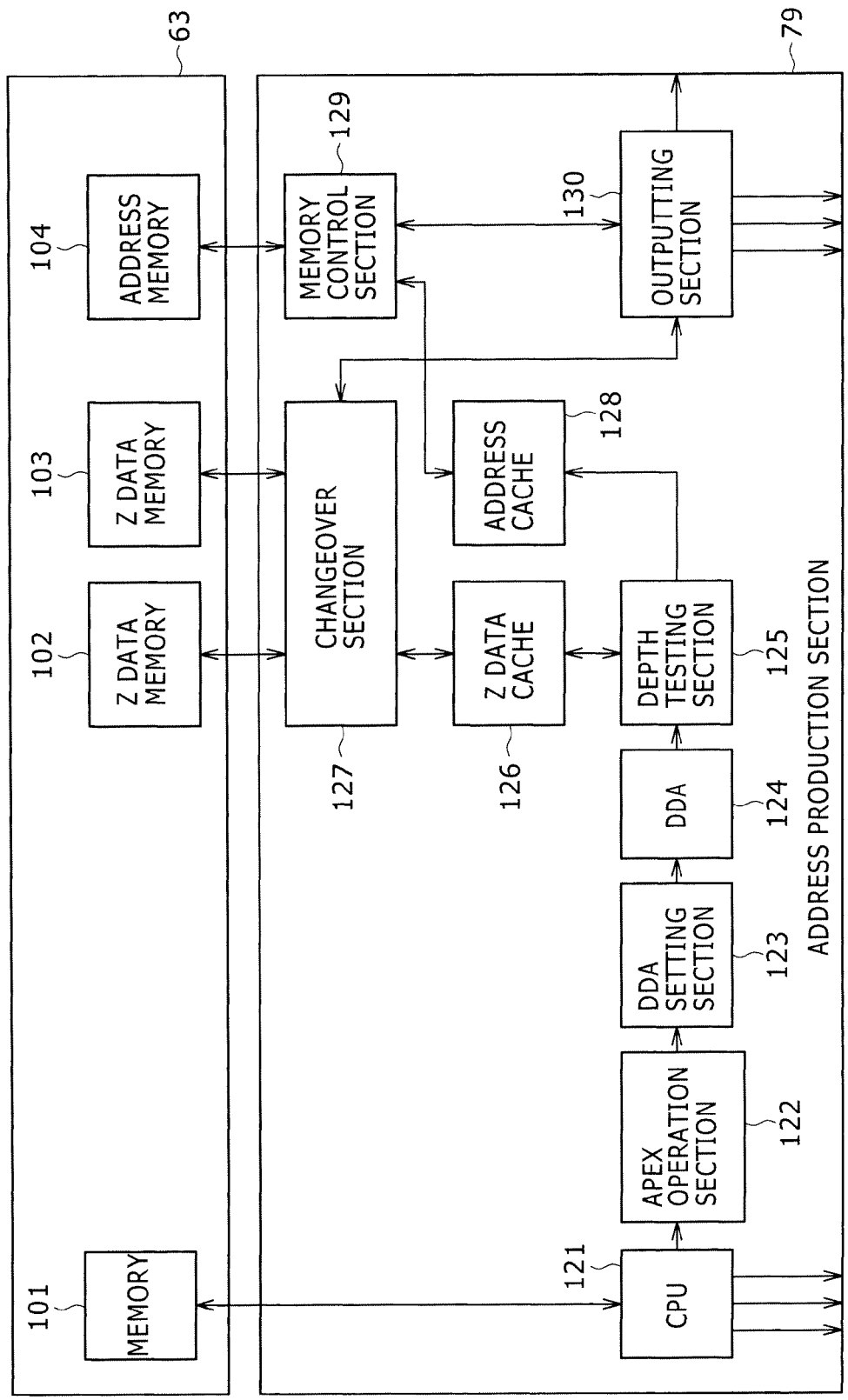
FIG. 8 is a block diagram showing an example of a detailed configuration of an external memory and an address production process shown in FIG. 6.

FIG. 8 shows an example of a detailed configuration of the external memory 63 and the address production section 79 shown in FIG. 6.

Referring to FIG. 8, the external memory 63 shown includes a memory 101, a z data memory 102, another z data memory 103, and an address memory 104.

Meanwhile, the address production section 79 includes a CPU (Central Processing Unit) 121, an apex operation section 122, a DDA (Digital Differential Analyzer) setting section 123, a DDA 124, and a depth testing section 125, a z data cache 126, a changeover section 127, an address cache 128, a memory control section 129, and an outputting section 130.

The CPU 121 controls the components of the image processing system 51 in accordance with a program stored in the memory 101 of the external memory 63.

For example, the CPU 121 supplies an instruction signal for the instruction of a mosaic effect, a postalization effect or a negative/positive reversal effect to the pre-processing section 71 in response to an instruction of the user. Further, the CPU 121 supplies an instruction signal for the instruction of defocusing in the horizontal direction to the horizontal filter 72 or supplies an instruction signal for the instruction of defocusing in the vertical direction to the vertical filter 73 in response to an instruction of the user.

Furthermore, the CPU 121 supplies a reduction ratio in the horizontal direction to the horizontal filter 72 and supplies a reduction ratio in the vertical direction to the vertical filter 73 in response to an instruction of the user. Further, the CPU 121 produces data (hereinafter referred to as apex data) regarding apexes of polygons, which compose a model corresponding to an image of a unit of a frame after transform, in a predetermined order in a unit of a polygon in response to a modeling operation of the user. Then, the CPU 121 supplies the produced apex data to the apex operation section 122. The order of production of apex data is hereinafter described with reference to FIGS. 10 to 13.

Further, the CPU 121 controls writing into and reading out from the memory 101. For example, the CPU 121 supplies an intermediate result or a final result of processing to the memory 101 together with a control signal for controlling writing into the memory 101 so that the intermediate result or final result of processing is stored into the memory 101. Further, the CPU 121 supplies a control signal for controlling reading out from the memory 101 to the memory 101 to read out the intermediate result or final result of processing from the memory 101 and performs such various processes as described above.

The apex operation section 122 performs apex operation in a unit of a polygon based on apex data supplied from the CPU 121 and supplies apex data obtained in a unit of a polygon by the apex operation to the DDA setting section 123. The DDA setting section 123 calculates parameters necessary for the DDA 124 such as a variation of the texture address by a change of the position on the screen based on the apex data in a unit of a polygon from the apex operation section 122. The DDA setting section 123 supplies the apex data and the parameters of a unit of a polygon to the DDA 124.

The DDA 124 converts the apex data of a unit of a polygon into pixel data based on the parameters supplied from the DDA setting section 123. The DDA 124 supplies pixel data obtained by the conversion to the depth testing section 125. The depth testing section 125 uses the pixel data from the DDA 124 and pixel data of the pixel, which corresponds to the pixel data, stored in the z data cache 126 to perform a shadow face erasure process.

In particular, the depth testing section 125 issues a request to read out z data stored in an associated relationship with an address (hereinafter referred to as z data pixel unit address) of a unit of a pixel associated with the position data included in the pixel data form the DDA 124 to the z data cache 126. Then, the depth testing section 125 acquires the z data read out in response to the request from the z data cache 126.

Then, the depth testing section 125 compares the z data with z data included in the pixel data from the DDA 124 to perform a depth test of deciding whether or not a polygon (which is hereinafter referred to suitably as new polygon) corresponding to the pixel data from the DDA 124 is positioned on the virtual eye point side with respect to the polygon (hereinafter referred to suitably as old polygon) corresponding to the z data stored already in the z data cache 126.

The depth testing section 125 supplies, in response to a result of the depth test, the z data and the writing coefficient included in the pixel data of the new polygon positioned on the virtual eye point side with respect to the old polygon to the z data cache 126 together with a z data pixel unit address corresponding to the pixel data. As a result, the z data cache 126 updates the z data and the writing coefficient of the old polygon stored in an associated with the z data pixel unit address from the depth testing section 125 with the z data and the writing coefficient of the new polygon, respectively.

Further, the depth testing section 125 outputs the texture address included in the pixel data of the new polygon positioned on the virtual eye point side with respect to the old polygon to the address cache 128 together with an address of a unit of a pixel corresponding to the position data included in the pixel data (the address is hereinafter referred to as texture pixel unit address).

The z data cache 126 temporarily stores the z data and the writing coefficient of a unit of a cache block as a cache block in an associated relationship with an address (hereinafter referred to as z data cache block unit address) of a unit of a cache block in the z data memory 102 or 103, in which the z data and the writing coefficient are stored, into a cache block region.

Further, the z data cache 126 searches, based on the z data pixel unit address supplied from the depth testing section 125, z data already stored therein for the z data corresponding to the z data pixel unit address whose reading out is demanded from the depth testing section 125. In particular, the z data cache 126 searches for a cache block including the z data of an object of request stored in an associated relationship with the z data cache block unit address corresponding to the z data pixel unit address from the depth testing section 125, and determines the z data of the object of the request in the cache block as a search result.

If the z data of the object of the request is searched out, then the z data cache 126 supplies the z data of the search result and the corresponding writing coefficient to the depth testing section 125. If the z data of the object of the request is not searched out, that is, if a cache block including the z data of the object of request is not stored, then the z data cache 126 transmits as follows. The z data cache 126 transmits the z data cache block unit address corresponding to the z data pixel unit address supplied from the depth testing section 125 together with the z data to the changeover section 127 to request the changeover section 127 to read out the z data of the object of the request and the corresponding writing coefficient. Consequently, the z data and the writing coefficient are read out in a unit of a block from the z data memory 102 or 103.

The z data cache 126 further stores z data and a writing coefficient of a unit of a cache block supplied from the changeover section 127 in response to the request temporarily as a cache block into the cache block region in an associated relationship with the z data cache block unit address transmitted to the changeover section 127 upon the request. Then, the z data cache 126 supplies the z data to the depth testing section 125.

Further, the z data cache 126 performs eviction of a cache block when it does not have a cache block region which can store. In particular, the z data cache 126 decides a cache block which makes an object of eviction, reads out the cache block and the z data cache block unit address associated with the cache block and supplies the cache block and the z data cache block unit address to the changeover section 127 together with an eviction request.

The changeover section 127 controls writing into and reading out from the z data memories 102 and 103. In particular, the changeover section 127 changes over the z data memory to be controlled from one to the other of the z data memories 102 and 103 of the external memory 63 in response to the request of the z data cache 126 or of the outputting section 130. For example, the changeover section 127 reads out, from one of the z data memories 102 and 103, the z data and the writing coefficient of a unit of a cache block stored in the z data cache block unit address from the z data cache 126 in response to the reading out request from the z data cache 126. The changeover section 127 supplies the read out z data and writing coefficient to the z data cache 126.

Further, the changeover section 127 stores the z data and the writing coefficient supplied thereto as a cache block into the z data cache block unit address supplied from the z data cache 126 in one of the z data memories 102 and 103 in response to an eviction request from the z data cache 126.

Further, the changeover section 127 reads out the z data and the writing coefficient from the other one of the z data memories 102 and 103 in response to a request from the outputting section 130 and supplies the z data and the writing coefficient to the outputting section 130. Thereafter, the changeover section 127 clears the read out z data and writing coefficient stored in the other one of the z data memories 102 and 103.

As described above, one of the z data memory 102 and the z data memory 103 stores z data and a corresponding writing coefficient for comparison by the depth testing section 125 while the other one of the z data memories 102 and 103 stores z data and a writing coefficient after the end of the depth test outputted through the outputting section 130.

In other words, the changeover section 127 performs changeover every time pixel data corresponding to a model for one frame are supplied to the depth testing section 125.

The address cache 128 temporarily stores a texture address of a cache block unit as a cache block in an associated relationship with an address (hereinafter referred to as texture cache block unit address) of a cache block unit in the address memory 104, in which the cache block is stored, in the cache block region. The address cache 128 temporarily stores, based on a texture pixel unit address from the depth testing section 125, a texture address of a cache block unit including a texture address outputted together with the texture pixel unit address as a cache block in an associated relationship with an address (hereinafter referred to as texture cache block unit address) of a cache block unit in the address memory 104, in which the cache block is stored, in the cache block region.

Further, the address cache 128 searches, based on the texture pixel unit address supplied from the depth test section 125, for a texture corresponding to the texture pixel unit address from among the texture addresses stored already therein. In particular, the address cache 128 searches for a cache block including a texture address corresponding to the texture pixel unit address from the depth test section 125 which is stored in an associated relationship with a texture cache block unit address corresponding to the texture pixel unit address. Then, the address cache 128 determines the thus searched out cache block as a search result.

If the texture address is searched out, then the address cache 128 updates the texture address of the search result into the texture address from the depth test section 125. If the texture address is not searched out, then the address cache 128 transmits the texture cache block unit address corresponding to the texture pixel unit address supplied from the depth test section 125 together with the texture to the memory control section 129 thereby to request the memory control section 129 to read out a texture address corresponding to the texture pixel unit address. Consequently, the texture cache address is read out in a unit of a cache block from the address memory 104.

Further, the address cache 128 temporarily stores the texture address in a unit of a cache block supplied thereto from the memory control section 129 in response to the request as a cache block in an associated with the texture cache block unit address transmitted to the memory control section 129 upon the request into the cache block region.

Further, when the address cache 128 does not have a cache block region which can store, the address cache 128 performs eviction of a cache block. In particular, the address cache 128 determines a cache block of an object of eviction, read out the cache block and a texture cache block unit address or the like associated with the cache block, and supplies the thus read out texture cache block unit address and so forth to the memory control section 129 together with an eviction request.

The memory control section 129 controls writing into and reading out from the address memory 104 which may be formed from an SDRAM or the like. In particular, the memory control section 129 reads out, in response to a reading out request from the address cache 128, a texture address of a unit of a cache block stored in the texture cache block unit address from the address cache 128 from the address memory. Then, the memory control section 129 supplies the thus read out texture address to the address cache 128.

Further, the memory control section 129 stores a texture address of a unit of a cache block supplied as a cache block from the address cache 128 in a unit of a cache block into a texture cache block unit address of the address memory 104 supplied together with the cache block to correct the texture address stored in the address memory 104 in response to a request from the address cache 128.

Further, the memory control section 129 reads out a texture address from the address memory 104 in response to a request from the outputting section 130 and supplies the read out texture address to the outputting section 130. Thereafter, the memory control section 129 clears the read out texture address stored in the address memory 104.

The outputting section 130 issues a request for reading out the z data and the writing coefficient of pixels after transform outputted from the addition section 77 in the order of the pixels and issues a request to read out a texture address to the memory control section 129. The outputting section 130 outputs, from between the z data and the writing coefficient supplied thereto from the changeover section 127 in response to the request, the z data to another DME or the like, and outputs the writing coefficient to the addition section 77. Further, the outputting section 130 supplies the integral part of a texture address supplied thereto from the memory control section 129 in response to the request to the RAM module 75 and supplies the decimal part of the texture address to the interpolation operation section 76.

Figure 9:
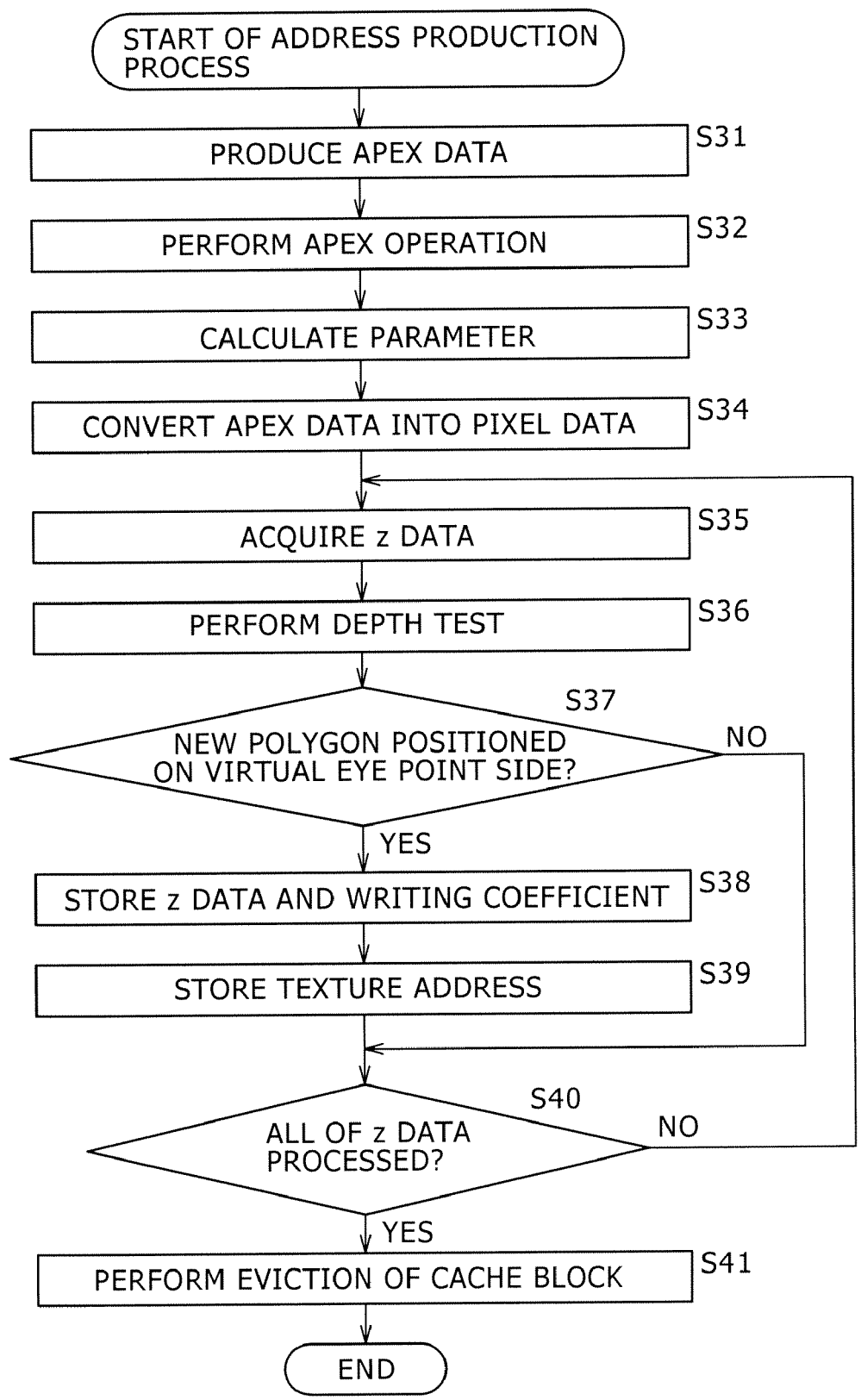
FIG. 9 is a flow chart illustrating an address production process.

Now, an address production process by the address production section 79 of producing a texture address is described with reference to FIG. 9. This address production process is started, for example, when the user performs a modeling operation. It is to be noted that the address production process of FIG. 9 is executed for each model corresponding to an image of a unit of a frame after transform.

At step S31, the CPU 121 produces apex data of polygons, which compose a model corresponding to an image after transform, in a predetermined order in response to a modeling operation of the user and supplies the produced apex data to the apex operation section 122.

After the process at step S31, the processing advances to step S32, at which the apex operation section 122 performs apex operation for each polygon based on apex data supplied from the CPU 121. The apex operation section 122 supplies apex data of a unit of a polygon obtained as a result of the apex operation to the DDA setting section 123.

After the process at step S32, the processing advances to step S33, at which the DDA setting section 123 calculates parameters necessary for the DDA 124 based on the apex data of a unit of a polygon from the apex operation section 122. The DDA setting section 123 supplies the apex data and the parameters of a unit of a polygon to the DDA 124.

After the process at step S33, the processing advances to step S34, at which the DDA 124 converts the apex data of a unit of a polygon into pixel data based on the parameters supplied from the DDA setting section 123 and supplies the pixel data to the depth testing section 125.

After the process at step S34, the processing advances to step S35, at which the depth testing section 125 issues a request to read out the z data of a pixel corresponding to the pixel data from the DDA 124 to the z data cache 126. Then, the depth testing section 125 acquires z data read out in response to the request.

After the process at step S35, the processing advances to step S36, at which the depth testing section 125 compares the z data acquired at step S35 with the z data included in the pixel data from the DDA 124 to perform a depth test of deciding whether or not the new polygon is positioned on the virtual eye point side with respect to the old polygon.

After the process at step S36, the processing advances to step S37, at which the depth testing section 125 decides whether or not the new polygon is positioned on the virtual eye point side with respect to the old polygon.

If it is decided at step S37 that the new polygon is positioned on the virtual eye point side with respect to the old polygon, then the depth testing section 125 supplies the z data and the writing coefficient included in the pixel data corresponding to the new polygon and the z data pixel unit address to the z data cache 126. Further, the depth testing section 125 supplies the texture address and the texture pixel unit address to the address cache 128.

Thereafter, at step S38, the z data cache 126 stores the z data and the writing coefficient from the depth testing section 125 in an associated relationship with the z data pixel unit address to update the z data and the writing coefficient of the old polygon with the z data and the writing coefficient of the new polygon.

After the process at step S38, the processing advances to step S39, at which the address cache 128 stores the texture address in an associated relationship with the texture pixel unit address.

When it is decided at step S37 that the new polygon is not positioned on the virtual eye point side with respect to the old polygon, that is, when the old polygon is positioned on the virtual eye point side with respect to the new polygon, or after the process at step S39, the processing advances to step S40. At step S40, the depth testing section 125 decides whether or not the depth test has been performed for all z data corresponding to the model for one frame and supplied from the DDA 124. If it is decided that the depth test has not been performed for all z data, then the processing returns to step S35 so that the processes at the steps beginning with step S35 are performed similarly.

On the other hand, if it is decided at step S40 that the depth test has been performed for all z data, then the processing advances to step S41, at which the z data cache 126 and the address cache 128 perform eviction of a cache block.

In particular, the z data cache 126 supplies cache blocks stored in the cache block region and z data cache block unit addresses stored in an associated relationship with the cache blocks to the z data memory 102 or 103 through the changeover section 127.

Further, the address cache 128 supplies the cache block stored in the cache block region and the z data cache block unit addresses stored in an associated relationship with the cache block to the address memory 104 through the memory control section 129.

It is to be noted that, at this time, the z data cache 126 and the address cache 128 may perform eviction of all cache blocks or may perform eviction of a cache block for which the updating has been performed.

After the address production process of FIG. 9, the outputting section 130 acquires the z data and the writing coefficient of pixels from the changeover section 127 in an order in which the pixels are outputted from the addition section 77. Then, the outputting section 130 outputs the z data to another DME or the like and supplies the writing coefficients to the addition section 77. Further, the outputting section 130 acquires the texture address of the pixel from the memory control section 129 and supplies the integral part of the texture address to the RAM module 75 while it supplies the decimal part of the texture address to the interpolation operation section 76.

Now, the order in which the CPU 121 shown in FIG. 8 produces apex data of polygons is described with reference to FIGS. 10 to 12.

Figure 1A:
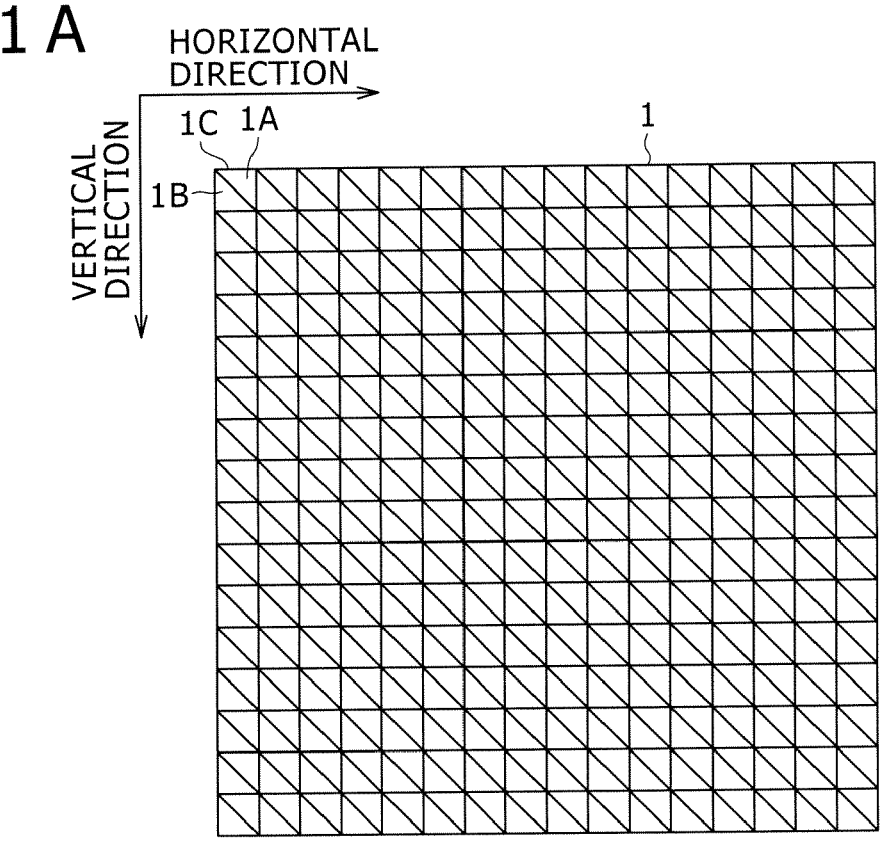
FIGS. 1A and 1B are schematic views showing an example of a mesh in the form of a square lattice.
Figure 1B:
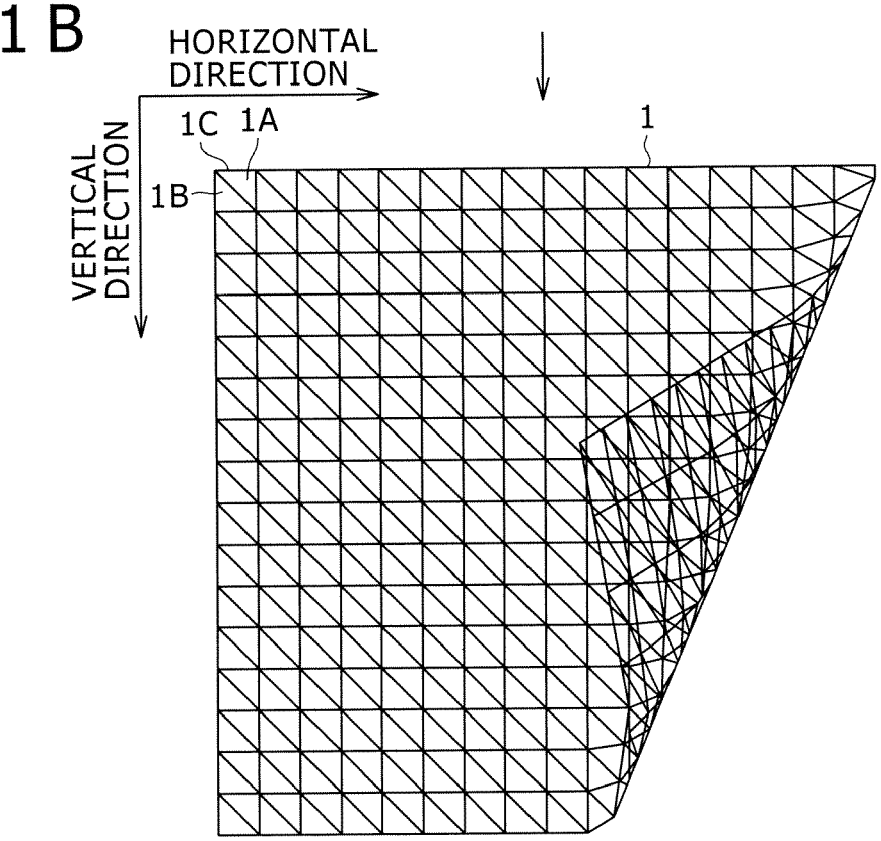
Figure 2A:
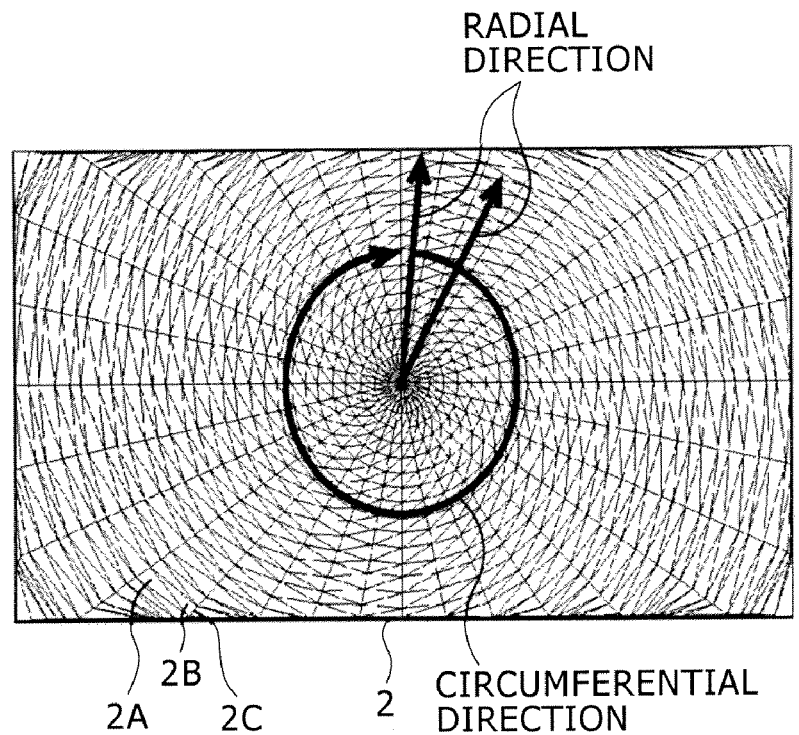
FIGS. 2A and 2B are schematic views showing an example of a mesh in the form of concentric circles.
Figure 2B:
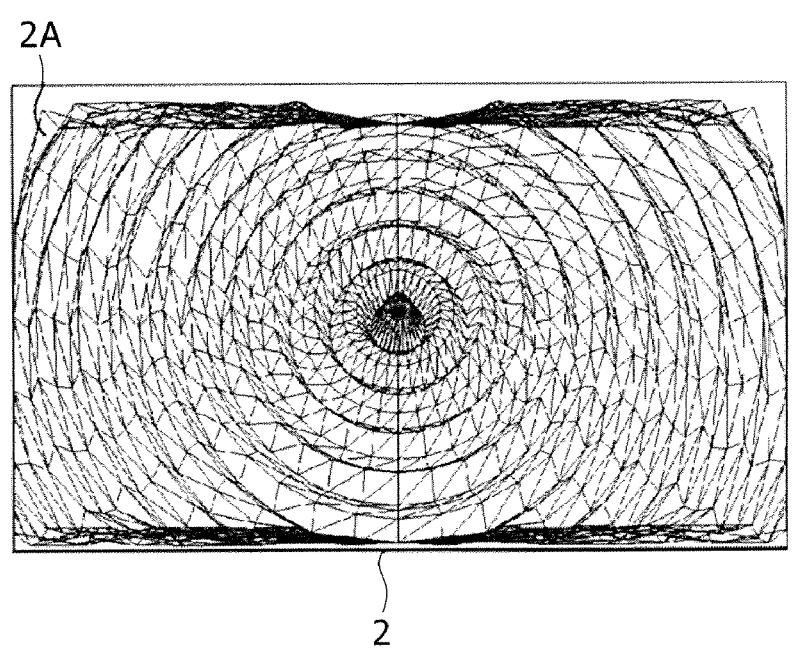
Figure 3:
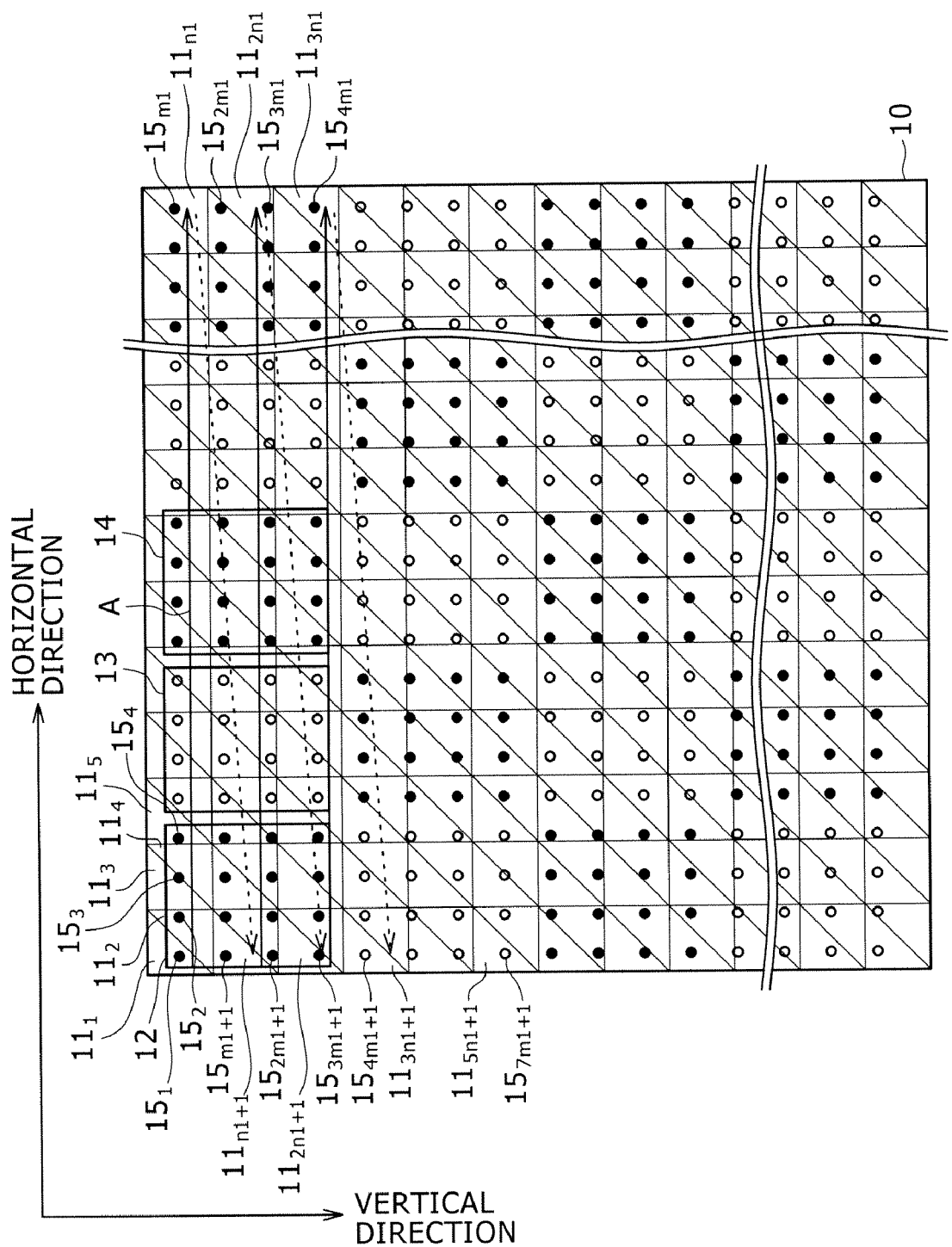
FIGS. 3, 4 and 5 are schematic views illustrating different examples of a conventional order of production of apex data.
Figure 4:
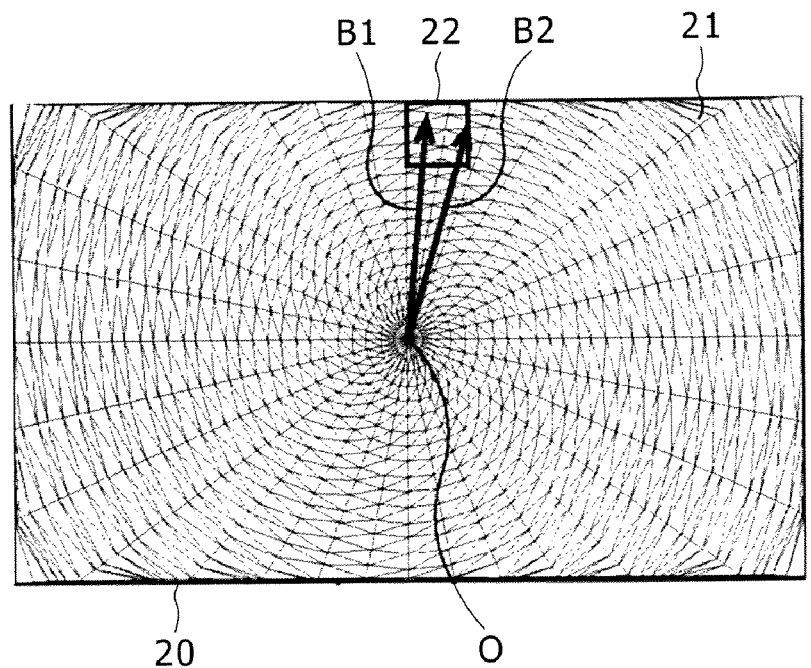
Figure 5:
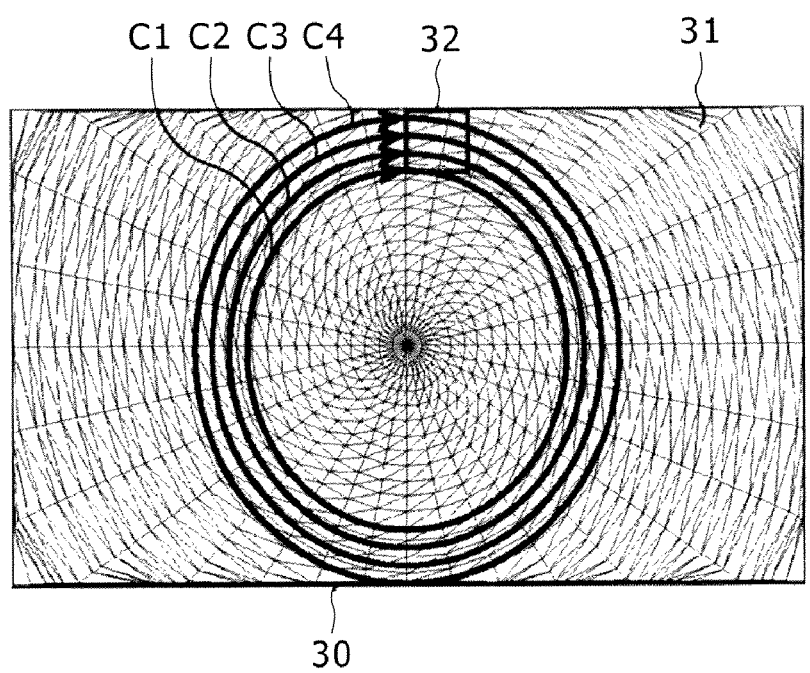
Figure 10:
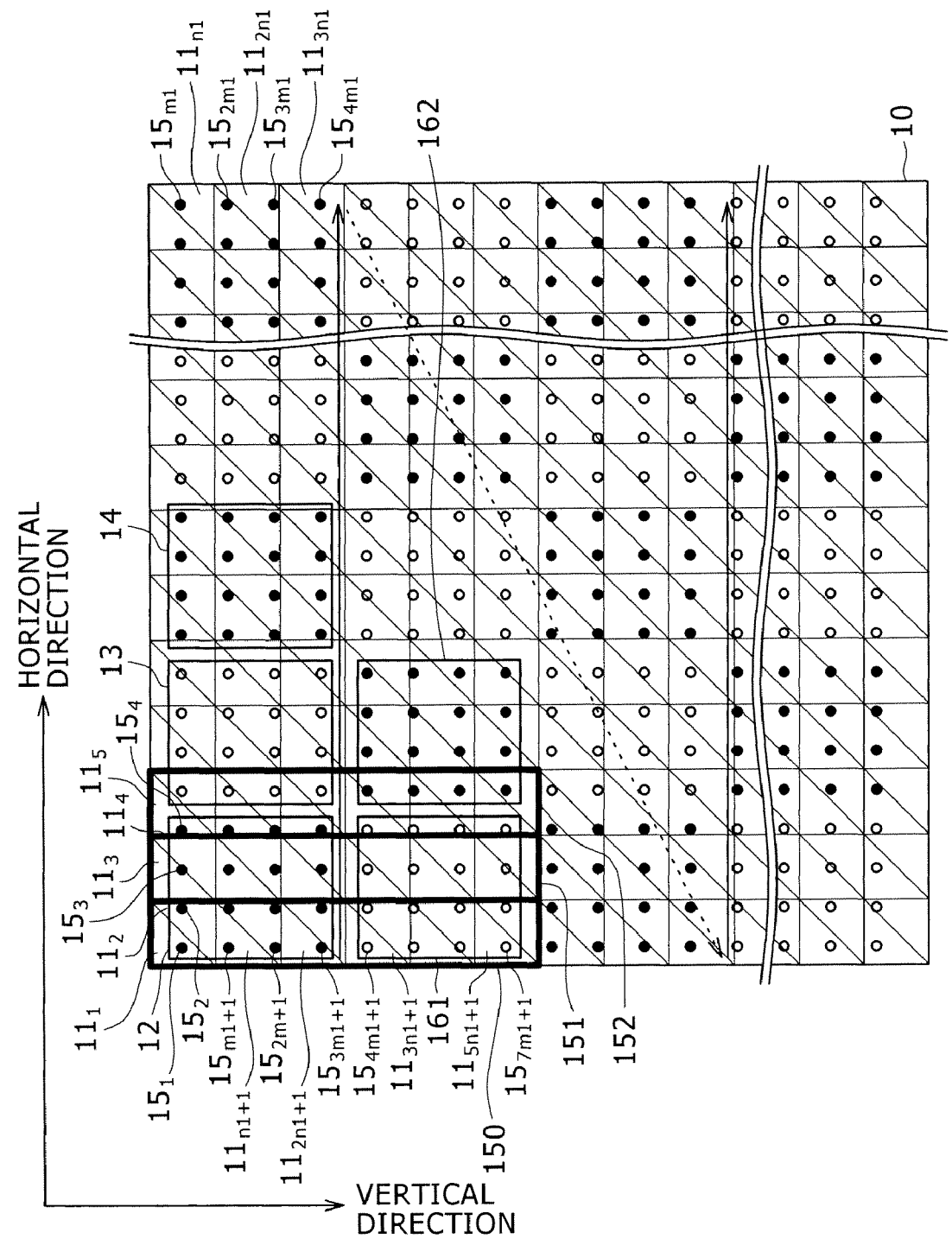
FIGS. 10, 11 and 12 are schematic views illustrating different orders of production of apex data by the image processing system.

FIG. 10 shows a model 10 which uses a mesh in the form of a square lattice same that shown in FIG. 3.

Referring to FIG. 10, a cache block is composed of z data and writing coefficients of 4×4 pixels. This similarly applies also to another model hereinafter described with reference to FIG. 11. Further, in FIG. 10, the model 10 shown is not in a transformed state of an image.

In FIG. 10, the CPU 121 determines polygon groups, each composed of 12 polygons juxtaposed in the vertical direction, successively as a block of an object of a production process for producing apex data (such block is hereinafter referred to as processing object block) in an order in which the polygon groups are juxtaposed in the horizontal direction. Then, the CPU 121 produces apex data of the polygons which compose the processing object block in a unit of a polygon in an order in which the polygons are juxtaposed in the vertical direction.

It is to be noted that, in the following description, a line of the direction (in the example of FIG. 10, the horizontal direction) corresponding to the order of polygon groups to be determined as the processing object block is referred to suitably as a basic movement line. Further, the direction (in the example of FIG. 10, the vertical direction) corresponding to the order of polygons which are successively determined as an object of a production process in the processing object block is hereinafter referred to as movement direction.

Here, the number of polygons which form the processing object block (such number is hereinafter referred to as movement amount) is determined such that, when a production process is performed for a processing object block, pixel data which are positioned on the boundary between the current object processing block and the immediately preceding processing object block and correspond to polygons in the immediately preceding object blocks may remain in the z data cache 126, that is, may not be evicted from the z data cache 126.

In particular, for example, if a cache block includes z data and writing coefficients of totaling x×x pixels wherein x pixels are juxtaposed in the horizontal direction and the vertical direction and N cache blocks can be stored into the z data cache 126, then where the lengths in the horizontal direction and the vertical direction of the pixels on a modeling coordinate system and a screen coordinate system are one, the max of the movement amount is represented by the following expression (1):

$$M = \text{floor}((x \times N - \text{Margin})/\text{Mesh\_Size}) \quad (1)$$

where the function floor( ) represents a maximum integer which does not exceed the value in ( ), and Mesh_Size is the distance of the model 10 in the vertical direction, that is, the length of the polygon 11 in the vertical direction. Further, Margin is a value determined in advance so that, even where transform of an image is performed, pixel data which corresponding to those polygons which are positioned on the boundary between the current object processing block and the immediately preceding processing object block may not be evicted from the z data cache 126.

In particular, in the expression (1) above, the maximum value M is determined based on a case wherein transform of an image is not performed, and an amount given by Margin is subtracted taking another case wherein transform of an image is performed into consideration.

A number equal to or lower than the maximum value M determined in such a manner as described above is determined as a movement amount. It is to be noted that, as the movement amount increases, the hit efficiency of the cache increases.

In FIG. 10, the maximum value M is 12, and the movement amount is 12 as described above.

In this instance, the CPU 121 first determines a polygon group including totaling 12 polygons $11_1, 11_2, 11_{n1+1}, 11_{n1+2}, 11_{2n1+1}, 11_{2n1+2}, 11_{3n1+1}, 11_{3n1+2}, 11_{4n1+1}, 11_{4n1+2}, 11_{5n1+1}, 11_{5n1+2}$ juxtaposed in the vertical direction as a processing object block 150. Then, the CPU 121 performs a production process in a unit of a polygon 11 in the order of the polygons mentioned.

Here, the apex operation section 122, DDA setting section 123 and DDA 124 processes apex data produced by the process of and outputted from the CPU 121 in a pipeline fashion. Therefore, image data corresponding to the polygons 11 are supplied in the order of the polygons $11_1, 11_2, 11_{n1+1}, 11_{n1+2}, 11_{2n1+1}, 11_{2n1+2}, 11_{3n1+1}, 11_{3n1+2}, 11_{4n1+1}, 11_{4n1+2}, 11_{5n1+1}, 11_{5n1+2}$ to the depth testing section 125.

In other words, image data of the pixels $15_1, 15_2, 15_{m1+1}, 15_{m1+2}, 15_{2m1+1}, 15_{2m1+2}, 15_{3m1+1}, 15_{3m1+2}, 15_{4m1+1}, 15_{4m1+2}, 15_{5m1+1}, 15_{5m1+2}, 15_{6m1+1}, 15_{6m1+2}, 15_{7m1+1}, 15_{7m1+2}$ are supplied in this order to the depth testing section 125. Accordingly, the depth testing section 125 reads out the z data of the pixels 15 in this order from the z data cache 126 and performs a depth test for the z data.

In this instance, the z data cache 126 first reads out the z data of the pixels $15_1$ to $15_4$, $15_{m1+1}$ to $15_{m1+4}$, $15_{2m1+1}$ to $15_{2m1+4}$ and $15_{3m1+1}$ to $15_{3m1+4}$ surrounded by a square 12 as a cache block from the z data memory 102 or 103 through the changeover section 127 and stores the read out z data. Then, the depth testing section 125 successively compares the z data of the pixels $15_1, 15_2, 15_{m1+1}, 15_{m1+2}, 15_{2m1+1}, 15_{2m1+2}, 15_{3m1+1}, 15_{3m1+2}$ with the z data included in the pixels $15_1, 15_2, 15_{m1+1}, 15_{m1+2}, 15_{2m1+1}, 15_{2m1+2}, 15_{3m1+1}, 15_{3m1+2}$ supplied from the DDA 124, respectively, to perform a depth test.

Then, the z data cache 126 reads out the z data of the pixels $15_{4m1+1}$ to $15_{4m1+4}$, $15_{5m1+1}$ to $15_{5m1+4}$, $15_{6m1+1}$ to $15_{6m1+4}$, and $15_{7m1+1}$ to $15_{7m1+4}$ surrounded by a square 161 as a cache block from the z data memory 102 or 103 and stores the read out z data. Then, the depth testing section 125 successively compares the z data of the pixels $15_{4m1+1}, 15_{4m1+2}, 15_{5m1+1}, 15_{5m1+2}, 15_{6m1+1}, 15_{6m1+2}, 15_{7m1+1}, 15_{7m1+2}$ with the z data included in the pixel data of the pixels $15_{4m1+1}, 15_{4m1+2}, 15_{5m1+1}, 15_{5m1+2}, 15_{6m1+1}, 15_{6m1+2}, 15_{7m1+1}, 15_{7m1+2}$ supplied from the DDA 124, respectively, to perform a depth test.

Thereafter, the depth testing section 125 performs a depth test using pixel data corresponding to apex data produced by the production process wherein a processing object block 151 neighboring in the horizontal direction with the processing object block 150 is determined as a processing object. However, the movement amount is determined such that pixel data corresponding to the polygons $11_2, 11_{n1+2}, 11_{2n1+2}, 11_{3n1+2}, 11_{4n1+2}, 11_{5n1+2}$ which are positioned on the boundary between the current processing object block 151 and the immediately preceding processing object block 150 may not be evicted from the z data cache 126, that is, the cache blocks corresponding to the squares 12 and 161 may not be evicted from the z data cache 126 as described hereinabove. Therefore, it is only necessary for the z data cache 126 to perform a depth test using the two cache blocks but is not necessary to read out a new cache block.

Further, the depth testing section 125 subsequently performs a depth test using pixel data corresponding to apex data produced by the production process wherein a processing object block 152 neighboring in the horizontal direction with the processing object block 151 is determined as a processing object. However, since the movement amount is determined such that pixel data corresponding to the polygons 11 which are positioned on the boundary between the current processing object block 152 and the immediately preceding processing object block 151 may not be evicted from the z data cache 126 as described hereinabove, it is only necessary for the z data cache 126 to newly read out the z data and writing coefficients of the pixels 15 surrounded by the squares 13 and 162 as cache blocks but is not necessary to read out the z data and writing coefficients of the pixels 15 surrounded by the squares 12 and 161 as cache blocks.

As described above, the CPU 121 determines polygon groups each composed of 12 polygons juxtaposed in the vertical direction successively as a processing object block in the order in which the polygon groups are juxtaposed in the horizontal direction and then produces apex data of the polygons which compose the processing object block in a unit of a polygon in the order in which the polygons are juxtaposed in the vertical direction. Therefore, the z data cache 126 need not read out each cache block by a plural number of times. In other words, the hit efficiency of the z data cache 126 is enhanced.

As a result, also where the size of the polygons is reduced to perform transform with a higher degree of accuracy, the image processing system 51 need not increase the bandwidth of the z data memories 102 and 103, and transform with a high degree of accuracy can be achieved while increase of the power consumption or the production cost is suppressed.

Figure 11:
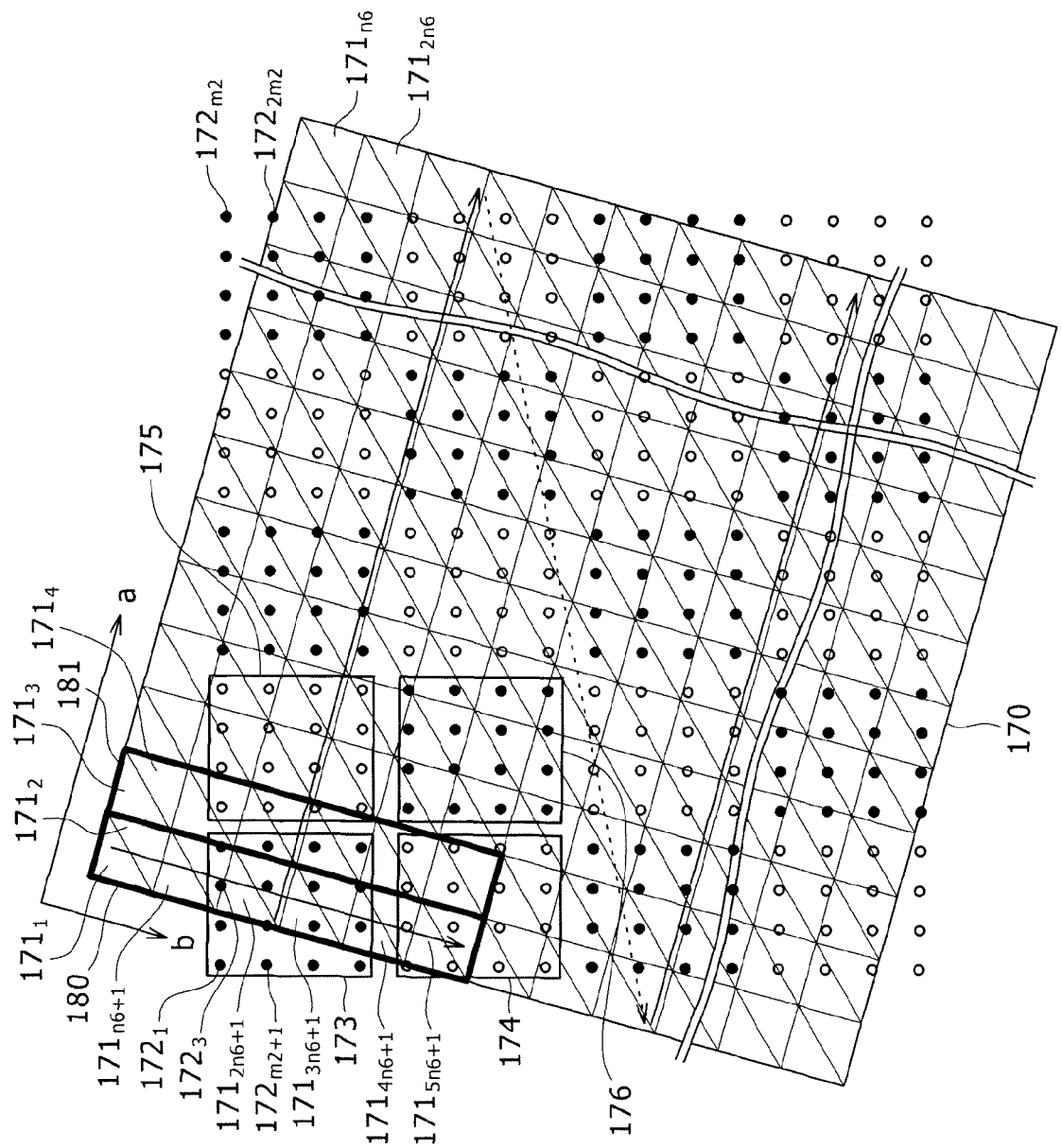

FIG. 11 shows a model 170 representing an image after transform when transform of rotating an image represented by the model 10 of FIG. 10 in the clockwise direction is performed.

In FIG. 11, the CPU 121 determines polygon groups each composed of 12 polygons juxtaposed in the direction indicated by an arrow mark b in FIG. 11 successively as a processing object block in the order in which the polygon groups are juxtaposed in the direction indicated by another arrow mark a which is perpendicular to the direction of the arrow mark b. Then, the CPU 121 produces apex data of polygons which compose the processing object block in a unit of a polygon in the order in which the polygons are juxtaposed in the direction of the arrow mark b. In other words, in FIG. 11, the basic movement line is a line in the direction of the arrow mark a while the movement direction is the direction of the arrow mark b.

It is assumed here that the movement amount in FIG. 11 is the maximum value M determined in accordance with the expression (1) given hereinabove. It is to be noted that, in this instance, Mesh_Size of the expression (1) is the pitch of the model 170 in the direction of the arrow mark b, that is, the length of a polygon 171 in the direction of the arrow mark b.

In this instance, the CPU 121 first determines totaling 12 polygons $171_1$, $171_2$, $171_{n6+1}$, $171_{n6+2}$, $171_{2n6+1}$, $171_{2n6+2}$, $171_{3n6+1}$, $171_{3n6+2}$, $171_{4n6+1}$, $171_{4n6+2}$, $171_{5n6+1}$, $171_{5n6+2}$ juxtaposed in the vertical direction as a processing object block 180 and performs a production process in a unit of a polygon 171 in this order. However, since the apex operation section 122 performs clipping, the apex data corresponding to the polygons 171 are supplied in the order of the polygons $171_{n6+2}$, $171_{2n6+1}$, $171_{2n6+2}$, $171_{3n6+1}$, $171_{3n6+2}$, $171_{4n6+1}$, $171_{4n6+2}$, $171_{5n6+1}$, $171_{5n6+2}$ to the DDA 124.

Accordingly, the DDA 124 converts the polygons 171 in the order of the polygons $171_{n6+2}$, $171_{2n6+1}$, $171_{2n6+2}$, $171_{3n6+1}$, $171_{3n6+2}$, $171_{4n6+1}$, $171_{4n6+2}$, $171_{5n6+1}$, $171_{5n6+2}$ into pixel data of corresponding pixels $172_3$, $172_4$, $172_{m2+3}$, $172_{2m2+2}$, $172_{2m2+3}$, $172_{3m2+2}$, $172_{3m2+3}$, $172_{4m2+2}$, $172_{5m2+1}$, $172_{5m2+2}$, respectively. Then, the DDA 124 supplies the resulting pixel data to the depth testing section 125.

The depth testing section 125 reads out the z data of the pixels 172 in the order in which the z data are supplied thereto from the DDA 124 from the z data cache 126 and performs a depth test.

At this time, the z data cache 126 first reads out the z data of the pixels $172_1$ to $172_4$, $172_{m2+1}$ to $172_{m2+4}$, $172_{2m2+1}$ to $172_{2m2+4}$, and $172_{3m2+1}$ to $172_{3m2+4}$ surrounded by a square 173 as a cache block from the z data memory 102 or 103 through the changeover section 127 and stores the read out z data. Then, the depth testing section 125 successively compares the z data of the pixels $172_3$, $172_4$, $172_{m2+3}$, $172_{2m2+2}$, $172_{2m2+3}$, $172_{3m2+2}$, $172_{3m2+3}$ with the z data included in the pixel data of the pixels $172_3$, $172_4$, $172_{m2+3}$, $172_{2m2+2}$, $172_{2m2+3}$, $172_{3m2+2}$, $172_{3m2+3}$ supplied from the DDA 124, respectively, to perform a depth test.

Then, the z data cache 126 reads out the z data of the pixels $172_{4m2+1}$ to $172_{4m2+4}$, $172_{5m2+1}$ to $172_{5m2+4}$, $172_{6m2+1}$ to $172_{6m2+4}$ and $172_{7m2+1}$ to $172_{7m2+4}$ surrounded by a square 174 as a cache block from the z data memory 102 or 103 and stores the read out z data. Then, the depth testing section 125 successively compares the z data of the pixels $172_{4m2+2}$, $172_{5m2+1}$, $172_{5m2+2}$ with the z data included in the pixel data of the pixels $172_{4m2+2}$, $172_{5m2+1}$, $172_{5m2+2}$ supplied from the DDA 124, respectively, to perform a depth test.

Thereafter, the depth testing section 125 performs a depth test using pixel data corresponding to apex data produced by the production process wherein a processing object block 181 neighboring in the direction indicated by an arrow mark a with the processing object block 180 is determined as a processing object. However, since the movement amount is determined such that pixel data corresponding to the polygons 171 which are positioned on the boundary between the current processing object block 181 and the immediately preceding processing object block 182 may not be evicted from the z data cache 126, it is only necessary for the z data cache 126 to read out the z data and writing coefficients of the pixels 172 surrounded newly by squares 175 and 176 as cache blocks but it is not necessary to read out the z data and writing coefficients of the pixels 172 surrounded by the squares 173 and 174 as cache blocks.

As described above, also where the image processing system 51 performs transform of an image, the CPU 121 determines polygon groups each composed of 12 polygons juxtaposed in the direction indicated by the arrow mark b successively as a processing object block in the order in which the polygon groups are juxtaposed in the direction indicated by the arrow mark a. Then, the CPU 121 produces apex data of polygons which compose the processing object block in a unit of a polygon in the order in which the polygons are juxtaposed in the direction of the arrow mark b. Consequently, the hit efficiency of the z data cache 126 is enhanced.

Figure 12:
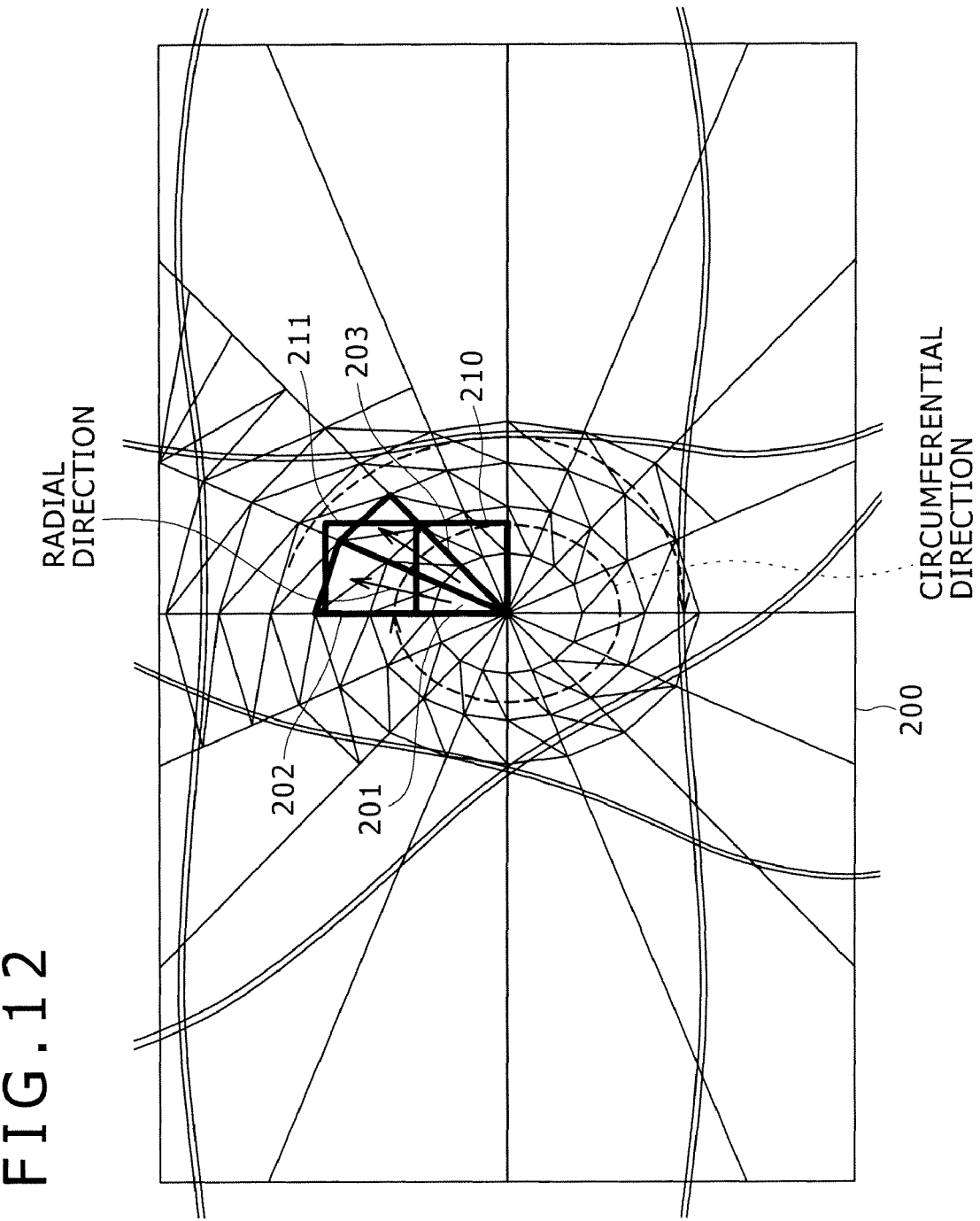

FIG. 12 shows a model 200 which uses a concentric mesh composed of polygons 201.

Referring to FIG. 12, the CPU 121 determines polygon groups each composed of five polygons 201 juxtaposed in a radial direction successively as a processing object block in the order in which the polygon groups are juxtaposed in a circumferential direction. Then, the CPU 121 produces apex data of polygons which compose the processing object block in a unit of a polygon in the order in which the polygons are juxtaposed in the radial direction. In other words, in FIG. 12, the basic movement line is a line extending in a circumferential direction, and the movement direction is a radial direction.

It is assumed here that the movement amount in FIG. 12 is the maximum value M determined in accordance with the expression (1) given hereinabove. It is to be noted that, in this instance, Mesh_Size of the expression (1) is the pitch of the model 200 in the projection direction, that is, the length of a polygon 201 in the projection direction of the polygons.

The CPU 121 first determines a polygon group composed of five polygons 201 juxtaposed in the projection direction as a processing object block 202 and performs a production process in a unit of a polygon 201 in the order in which the polygons 201 are juxtaposed in the projection direction.

As a result, pixel data corresponding to the polygons 201 which compose the processing object block 202 are supplied in the order in which the polygons 201 are juxtaposed in the projection direction to the depth testing section 125. The depth testing section 125 reads out the z data included in the pixel data in the order in which the z data are supplied from the DDA 124 from the z data cache 126 to perform a depth test.

At this time, the z data cache 126 first reads out the z data of the pixels surrounded by a square 210 as a cache block from the z data memory 102 or 103 through the changeover section 127 and stores the read out z data. Then, the depth testing section 125 successively compares the z data of the pixels corresponding to the pixel data supplied from the DDA 124 with the z data included in the pixel data supplied from the DDA 124, respectively, to perform a depth test.

Then, the z data cache 126 reads out the z data of the pixels surrounded by a square 211 as a cache block from the z data memory 102 or 103 and stores the read out z data. Then, the depth testing section 125 successively compares the z data of the pixels corresponding to the pixel data supplied from the DDA 124 with the z data included in the pixel data supplied from the DDA 124, respectively, to perform a depth test.

Thereafter, the depth testing section 125 performs a depth test using pixel data corresponding to apex data produced by the production process wherein a processing object block 203 neighboring in the circumferential direction with the processing object block 202 is determined as a processing object. However, since the movement amount is determined such that pixel data corresponding to the polygons 201 which are positioned on the boundary between the current processing object block 203 and the immediately preceding processing object block 202 may not be evicted from the z data cache 126, it is not necessary for the z data cache 126 to read out the z data and writing coefficients of the pixels surrounded newly by squares 210 and 211 as cache blocks.

As described above, also where the model is composed of the concentric mesh model 200, the CPU 121 determines polygon groups each composed of five polygons juxtaposed in the projection direction successively as a processing object block in the order in which the polygon groups are juxtaposed in the circumferential direction. Then, the CPU 121 produces apex data of polygons which compose the processing object block in a unit of a polygon in the order in which the polygons are juxtaposed in the projection direction. Consequently, the hit efficiency of the z data cache 126 is enhanced.

It is to be noted that, although the hit efficiency of the z data cache 126 for z data in a depth test is described above with reference to FIGS. 10 to 12, also the hit efficiency of the address cache 128 in storage of texture addresses is enhanced similarly.

Further, by the expression (1) given hereinabove, the maximum value M is determined based on a case wherein transform of an image is not performed as described hereinabove. Therefore, where enlargement or reduction is performed in modeling conversion by the apex operation section 122, it is necessary to make amendment. In particular, where enlargement is performed, it is necessary to reduce the movement amount, but where reduction is performed, it is necessary to increase the movement amount.

Accordingly, where the enlargement/reduction ratio is represented by S, the maximum value M of the movement amount can be represented by the following expression (2) by multiplying the same by a reciprocal to the enlargement/reduction ratio S:

$$M=follr(x \times N-\text{Margin})/\text{Mesh\_Size}/S) \qquad (2)$$

It is to be noted that, where enlargement or reduction is not involved in the expression (2), since the enlargement/reduction radio S is 1, the expression (2) is equivalent to the expression (1). Thus, also where enlargement or reduction is not involved, the maximum value M satisfies the expression (2). In other words, irrespective of whether or not enlargement or reduction is performed, the maximum value M can be represented by the expression (2).

Now, an outputting process executed by the CPU 121 to output apex data to the apex operation section 122 is described with reference to FIG. 13. This outputting process corresponds to the step S31 of FIG. 9.

At step S51, the CPU 121 determines the first polygon group on the first basic movement line as a processing object block. Then, the processing advances to step S52.

At step S52, the CPU 121 determines the first polygon in the movement direction from among the polygons in the processing object block as a processing object. Then, the processing advances to step S53.

At step S53, the CPU 121 performs a production process of producing apex data of the polygon of the processing object in a unit of a polygon and supplies the resulting apex data to the apex operation section 122. The apex data are used for apex operation at step S32 of FIG. 9.

After the process at step S53, the processing advances to step S54, at which the CPU 121 decides whether or not the production process for the current processing object block is completed, that is, whether or not the apex data of all polygons of the current processing object block are produced. Then, if it is decided that the production process for the current processing object block is not completed as yet, then the processing advances to step S55.

At step S55, the CPU 121 determines a polygon next to the current processing object polygon in the movement direction from among the polygons in the current processing object block as a new processing object. Then, the processing returns to step S53 so that the processes described above are repeated.

On the other hand, if it is decided at step S54 that the production process for the current processing object block is completed, that is, if the current processing object is the last polygon in the movement direction in the processing object block, then the processing advances to step S56. At step S56, the CPU 121 decides whether or not the current processing object block is the last processing object block on the current basic movement line.

If it is decided at step S56 that the current processing object block is not the last processing object block on the current basic movement line, then the processing advances to step S57. At step S57, the CPU 121 decides a next polygon group on the current basic movement line as a processing object block. Thereafter, the processing returns to step S53.

On the other hand, if it is decided at step S56 that the current processing object block is the last processing object block on the current basic movement line, then the processing advances to step S58. At step S58, the CPU 121 decides whether or not the current basic movement line is the last basic movement line.

If it is decided at step S58 that the current basic movement line is not the last basic movement line, then the processing advances to step S59, at which the CPU 121 determines the first polygon group of the next basic movement line as a processing object block.

On the other hand, if it is decided at step S58 that the current basic movement line is the last basic movement line, then the processing is ended.

Now, an example of an image processing apparatus 250 in which the DME 11 is incorporated is described with reference to FIG. 14.

The image processing apparatus 250 includes a CPU (Central Processing Unit) 251 and a DME 11 which execute various processes in accordance with a program stored in a ROM (Read Only Memory) 252 or recorded in a recording section 258. A program to be executed by the CPU 251, data to be used by the CPU 251 and so forth are suitably stored into a RAM (Random Access Memory) 253. The DME 11, CPU 251, ROM 252 and RAM 253 are connected to each other by a bus 254.

Also an input/output interface 255 is connected to the CPU 251 through the bus 254. An inputting section 256 including a keyboard, a mouse, a microphone, a reception section for receiving an instruction transmitted from a remote controller not shown and so forth and an outputting section 257 including a display unit, a speaker and so forth are connected to the input/output interface 255. The CPU 251 executes various processes in response to an instruction inputted from the inputting section 256. Then, the CPU 251 outputs results of the processes to the outputting section 257.

For example, the CPU 251 controls the DME 11 in response to an instruction inputted from the inputting section 256 to perform reduction, enlargement, change of the type, rotation, leftward and rightward reversal, inversion or movement of an input image or apply a special effect to an input image. Then, the CPU 251 controls the outputting section 257 to display an image based on an image outputted from the DME 11.

The recording section 258 connected to the input/output interface 255 includes, for example, a hard disk and stores a program to be executed by the CPU 251 and various data. A communication section 259 communicates with an external apparatus through a network such as the Internet or a local area network. It is to be noted that a program recorded in the recording section 258 may be acquired through the communication section 259.

A drive 260 connected to the input/output interface 255 drives a removable medium 261 such as a magnetic disk, an optical disk, a magneto-optical disk or a semiconductor memory when the removable medium 261 loaded therein to acquire a program or data recorded on the removable medium 261. The acquired program or data is transferred to and recorded by the recording section 258 as occasion demands.

Now, an example of a recording and reproduction apparatus 300 in which the DME 11 is incorporated is described with reference to FIG. 15.

The recording and reproduction apparatus 300 includes a CPU 301 and a DME 11 which execute various processes in accordance with a program stored in a ROM 306 or recorded on a recording section 305. A program to be executed by the CPU 301, data and so forth are stored suitably into a RAM 307. The DME 11, CPU 301, ROM 306 and RAM 307 are connected to each other by a bus.

Also an input I/F (interface) 309 and an output control section 310 are connected to the CPU 301 through the bus. An inputting section 308 is connected to the input I/F 309 and includes a keyboard, a mouse, a microphone, a reception section for receiving an instruction transmitted from a remote controller not shown and so forth, an image pickup section for picking up an image of an image pickup object and so forth. Meanwhile, an outputting section 311 is connected to the output control section 310 and includes a display unit, a speaker and so forth. The CPU 301 executes various processes in response to an instruction inputted thereto from the inputting section 308 through the input I/F 309. The CPU 301 outputs results of the processes to the outputting section 311 through the output control section 310.

For example, the CPU 301 controls the DME 11 in response to an instruction inputted thereto from the inputting section 308 to perform reduction, enlargement, change of the type, rotation, leftward and rightward reversal, inversion or movement of an input image or applies a special effect to an input image. Further, the CPU 301 controls the outputting section 311 to display, based on an image outputted from the DME 11, the display through an output control section 310.

Further, an encoding/decoding circuit 302 and a recording and reproduction control section 304 are connected to the CPU 301 through the bus. The encoding/decoding circuit 302 retains an image obtained, for example, as a result of image pickup by the inputting section 308 into a buffer memory 303 as occasion demands and encodes the image in accordance with a predetermined encoding system such as the JPEG (Joint Photographic Experts Group) or MPEG (Moving Picture Experts Group) system under the control of the CPU 301. Then, the encoding/decoding circuit 302 records an image obtained as a result of the encoding into the recording section 305 through the recording and reproduction control section 304.

The recording and reproduction control section 304 controls recording and reproduction of the recording section 305 under the control of the CPU 301. In particular, the recording and reproduction control section 304 controls the recording section 305 to record an image supplied from the encoding/decoding circuit 302 or supplies an image read out from the recording section 305 to the encoding/decoding circuit 302. The encoding/decoding circuit 302 decodes the image from the recording and reproduction control section 304 and supplies an image obtained as a result of the decoding, for example, as an input image to the DME 11 under the control of the CPU 301.

The present invention can be applied, for example, to a GPU (Graphics Processing Unit).

It is to be noted that, in the present specification, the steps which describe the program recorded in a program recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

While a preferred embodiment of the present invention has been described using specific terms, such description is for illustrative purpose only, and it is to be understood that changes and variations may be made without departing from the spirit or scope of the following claims.

What is claimed is:

1. An image processing apparatus, comprising:
a production section configured to determine a predetermined number of polygons juxtaposed in a first direction as an object block, in an order in which the polygons are juxtaposed in a second direction perpendicular to the first direction, and produce apex data of the polygons composing the object block in a unit of an object block;

a conversion section configured to convert the produced apex data into first pixel data;

a temporary storage section configured to store second pixel data temporarily in a unit of a data block composed of a plurality of pixel data; and a comparison section configured to compare the first pixel data resulting from the conversion by the conversion section with the second pixel data stored in the temporary storage section, wherein the number of polygons which compose the object block and are juxtaposed in a first direction is determined so that the second pixel data, corresponding to the polygons which are positioned in a boundary position of an immediately preceding object block to the object block, is stored into the temporary storage section.

2. The image processing apparatus according to claim 1, further comprising:

a storage section configured to store the second pixel data, wherein the temporary storage section stores the second pixel data temporarily read from the storage section.

3. The image processing apparatus according to claim 1, wherein the number of polygons which compose the object block and are juxtaposed in a first direction is determined by the number of the plurality of pixel data composing the data block, the number of the data block being stored in the temporary storage section, and a length of the polygons.

4. The image processing apparatus according to claim 1, wherein the first and second pixel data include z data of the pixels, and said image processing apparatus further comprising:

a transform processing section configured to compare the z data included in the first pixel data resulting from the conversion by the conversion section with the z data included in the second pixel data, which are stored in the temporary storage section, of the pixels corresponding to the pixel data to perform a transform process of transforming an image composed of the pixels.

5. An image processing method, comprising:

determining, using a processor, a predetermined number of polygons juxtaposed in a first direction as an object block, in an order in which the polygons are juxtaposed in a second direction perpendicular to the first direction;

producing, using the processor, apex data of the polygons composing the object block in a unit of an object block;

converting, in a conversion section, the produced apex data into first pixel data;

storing, in a temporarily storing section, second pixel data temporarily in a unit of a data block composed of a plurality of pixel data; and comparing, in a comparing section, the first pixel data resulting from the conversion with the stored second pixel data, wherein the number of polygons which compose the object block and are juxtaposed in a first direction is determined so that the second pixel data, corresponding to the polygons which are positioned in a boundary position of an immediately preceding object block to the object block, is temporarily stored.

6. The image processing method according to claim 5, further comprising:

second storing, in a storage section, the second pixel data; and third storing, in the temporary storage section, the second pixel data temporarily read from the storage section.

7. The image processing method according to claim 5, further comprising:

determining the number of polygons which compose the object block and are juxtaposed in a first direction by the number of the plurality of pixel data composing the data block, the number of the data block being stored in the temporary storage section, and a length of the polygons.

8. The image processing method according to claim 5, wherein the first and second pixel data include z data of the pixels, and the method further comprising:

comparing, by a transform processing section, the z data included in the first pixel data resulting from the conversion with the z data included in the second pixel data, which are stored in the temporary storage section, of the pixels corresponding to the pixel data to transform an image composed of the pixels.

9. A non-transitory computer-readable storage medium including computer executable instructions, wherein the instructions, when executed by a computer, cause the computer to perform a method for image processing, the method comprising:

determining a predetermined number of polygons juxtaposed in a first direction as an object block, in an order in which the polygons are juxtaposed in a second direction perpendicular to the first direction;

producing apex data of the polygons composing the object block in a unit of an object block;

converting the produced apex data into first pixel data;

storing second pixel data temporarily in a unit of a data block composed of a plurality of pixel data; and comparing the first pixel data resulting from the conversion with the stored second pixel data, wherein the number of polygons which compose the object block and are juxtaposed in a first direction is determined so that the second pixel data, corresponding to the polygons which are positioned in a boundary position of an immediately preceding object block to the object block, is temporarily stored.

* * * * *